US006251555B1

(12) United States Patent
Hayashi et al.

(10) Patent No.: US 6,251,555 B1
(45) Date of Patent: *Jun. 26, 2001

(54) BLACK MAGNETIC COMPOSITE PARTICLES FOR BLACK MAGNETIC TONER AND BLACK MAGNETIC TONER USING THE SAME

(75) Inventors: Kazuyuki Hayashi; Seiji Ishitani, both of Hiroshima; Yasuyuki Tanaka, Onoda; Hiroko Morii, Hiroshima, all of (JP)

(73) Assignee: Toda Kogyo Corporation, Hiroshima-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,198

(22) Filed: Apr. 14, 1999

(30) Foreign Application Priority Data

Apr. 17, 1998 (JP) ........................................ 10-124147

(51) Int. Cl.[7] ........................ J03G 9/083; B32B 5/16

(52) U.S. Cl. .................... 430/106.6; 428/403; 428/405

(58) Field of Search ........................ 430/106.6, 106; 428/405, 403

(56) References Cited

U.S. PATENT DOCUMENTS

| | | | | |
|---|---|---|---|---|
| 5,364,720 | * | 11/1994 | Nakazawa et al. | 430/106.6 |
| 5,389,482 | * | 2/1995 | Okano et al. | 430/106.6 |
| 5,599,627 | | 2/1997 | Aoki et al. . | |
| 5,604,071 | | 2/1997 | Okado et al. . | |
| 5,731,120 | * | 3/1998 | Tanigami et al. | 430/106.6 |
| 5,843,610 | * | 12/1998 | Uchida et al. | 430/106.6 |

FOREIGN PATENT DOCUMENTS

| | | |
|---|---|---|
| 0498942A1 | 8/1992 | (EP) . |
| 0523654A1 | 1/1993 | (EP) . |
| 0566790A1 | 10/1993 | (EP) . |
| 0652490A2 | 5/1995 | (EP) . |
| 58-014143 | 1/1983 | (JP) . |
| 06230604 | 8/1994 | (JP) . |
| WO96/38768 | 12/1996 | (WO) . |

OTHER PUBLICATIONS

Grant, Roger et al. Grant and Hackh's Chemical Dictionary. New York: McGraw–Hill, Inc. p. 531, "silicone", 1987.*

* cited by examiner

*Primary Examiner*—Christopher Rodee
(74) *Attorney, Agent, or Firm*—Nixon & Vanderhye

(57) ABSTRACT

Black magnetic composite particles for black magnetic toner according to the present invention comprise:

magnetite particle as core particle;

fine particles which are adhered or exist on at least a part of the surface of each magnetite particle, and comprise oxides, oxide hydroxides or oxides and oxide hydroxides composed of at least one element selected from the group consisting of Si, Zr, Ti, Al and Ce; and a methyl hydrogen polysiloxane coating layer formed on said fine particles or said fine particles and the exposed surface of the magnetite particle, the average particle size of said black magnetic composite particles being 0.08 to 1.0 $\mu$m.

Such black magnetic composite particles are suitable for a black magnetic toner which can exhibit not only an excellent flowability but also a high volume resistivity.

22 Claims, 4 Drawing Sheets

(×30000)

(×30000)

(×30000)

(×30000)

(×30000)

(×30000)

(×30000)

(×30000)

BLACK MAGNETIC COMPOSITE PARTICLES FOR BLACK MAGNETIC TONER AND BLACK MAGNETIC TONER USING THE SAME

BACKGROUND OF THE INVENTION

The present invention relates to black magnetic composite particles for a black magnetic toner and a black magnetic toner using the black magnetic composite particles, and more particularly, to black magnetic composite particles for a black magnetic toner which can exhibit not only an excellent flowability but also a high volume resistivity, and a black magnetic toner using such black magnetic composite particles.

As one of conventional electrostatic latent image-developing methods, there has been widely known and generally adopted a so-called one component system development method of using as a developer, a magnetic toner comprising composite particles prepared by mixing and dispersing black magnetic particles such as magnetite particles in a binder resin, without using a carrier.

The conventional development methods of using one-component magnetic toner have been classified into CPC development methods of using a low-resistance magnetic toner, and PPC development methods of using a high-resistance magnetic toner.

In the CPC methods, the low-resistance magnetic toner used therefor has an electric conductivity, and is charged by the electrostatic induction due to electric charge of the latent images. However, since the charge induced on the magnetic toner is lost while the magnetic toner is transported from a developing zone to a transfer zone, the low-resistance magnetic toner is unsuitable for the PPC development method of using an electrostatic transfer method. In order to solve this problem, there have been developed the insulated or high resistance magnetic toners having a volume resistivity as high as not less than $10^{12}$ Ω·cm.

Recently, with the high image quality such as high image density or high tone gradation, or with the high copying speed of duplicating machines, it has been strongly demanded to further enhance characteristics of the insulted or high-resistance magnetic toners as a developer, especially a fluidity thereof.

It has been strongly desired that the insulated or high-resistance black magnetic toners are improved in flowability in order to obtain copies which are free from unevenness of developed images, and show a high definition and an excellent gradation.

With respect to such demands, in Japanese Patent Application Laid-Open (KOKAI) No. 53-94932(1978), there has been described "these high-resistance magnetic toners are deteriorated in fluidity due to the high electric resistance, so that there arises such a problem that non-uniformity of developed images tend to be caused. Namely, although the high-resistance magnetic toners for PPC development method can maintain necessary charges required for image transfer, the magnetic toners are frictionally charged even when they are present in other steps than the transfer step, where the magnetic toners are not required to be charged, e.g., in a toner bottle or on the surface of a magnetic roll, or also slightly charged by mechano-electrets during the production process of these magnetic toners. Therefore, the magnetic toners tend to be electrostatically agglomerated, resulting in deterioration of fluidity thereof", and "It is an another object of the present invention to provide a high-resistance magnetic toner for PPC development method which is improved in fluidity, can be prevented from causing non-uniformity of developed images, and has an excellent image definition and tone gradation, thereby obtaining high-quality copies by indirect copying methods".

In recent years, with the reduction in particle size of the insulated or high-resistance magnetic toners, it has been increasingly desired to enhance the fluidity thereof.

With respect to such a fact, in "Recent Electrophotographic Developing System and Comprehensive Data Collection for Development and Utilization of Toner Materials" published by Japan Scientific Information Co., Ltd. (1985), page 121, there has been described "With extensive development of printers such as ICP, a high image quality has been required. In particular, it has been demanded to develop high-precision or high-definition printers. In Table 1, there is shown a relationship between definitions obtained by using the respective toners. As is apparent from Table 1, the smaller the particle size of wet toners, the higher the image definition is obtained. Therefore, when a dry toner is used, in order to enhance the image definition, it is also required to reduce the particle size of the toner . . . As reports of using toners having a small particle size, it has been proposed that by using toners having a particle size of 8.5 to 11 μm, fogs on a background can be improved and toner consumption can be reduced, and further by using polyester-based toners having a particle size of 6 to 10 μm, an image quality, a charging stability and lifetime of the developer can be improved. However, when such toners having a small particle size are used, it has been required to solve many problems. There are problems such as improvement in productivity, sharpness of particle size distribution, improvement in fluidity, etc.".

Further, insulated or high-resistance black magnetic toners widely used at the present time, have been required to show a high degree of blackness and a high image density for line images and solid area images on copies.

With respect to this fact, on page 272 of the above-mentioned "Recent Electrophotographic Developing System and Comprehensive Data Collection for Development and Utilization of Toner Materials", there has been described "Powder development is characterized by a high image density. However, the high image density as well as the fog density as described hereinafter, greatly influences image characteristics obtained".

Further, it is necessary that the insulated or high-resistance black magnetic toners can retain a charge amount required for the development of latent images, as described above. Therefore, it has also been strongly desired that the insulated or high-resistance black magnetic toners have a volume resistivity as high as not less than $10^{12}$ Ω·cm.

With respect to this fact, in Japanese Patent Application Laid-Open (KOKAI) No. 54-139544(1979), it has been described that "Generally, in electrophotographic copying apparatuses of PPC (plain paper copy) type, when a magnetic toner is used as a developer for developing electrostatic latent images, the use of a magnetic toner having a lower electrical resistance is preferred to neutralize the charge on the electrostatic latent images upon development thereof. On the other hand, upon transfer of the developed images, the use of a higher-resistance magnetic toner is preferred to obtain a good transfer efficiency and sharp images. That is, the characteristics of the magnetic toner required for a good developability, conflict with those for a good transfer efficiency. Accordingly, in order to satisfy both the developability and the transfer efficiency, it is, as a matter of course, necessary to restrict the electrical resistance of the magnetic toner in a specific range. Namely, it is preferred that the electrical resistance of the magnetic toner is usually $10^{12}$ to $10^{14}$ Ω·cm. Thus, it is known that when the electrical resistance of the magnetic toner lies within such a specific range, it is possible to obtain good results concerning both developability and transfer efficiency".

There is a close relationship between characteristics of the insulated or high-resistance black magnetic toners and properties of magnetite particles which are mixed and dispersed in the black magnetic toner to impart magnetism to the toner, and serve as a black colorant.

That is, since the flowability of the black magnetic toner largely depends upon surface conditions of the magnetite particles exposed to the surface of each black magnetic toner particle, it has been strongly required that the magnetite particles themselves have an excellent flowability.

The blackness and density of the black magnetic toner also largely depend upon those of the magnetite particles contained in the black magnetic toner. Accordingly, in order to obtain a black magnetic toner having an excellent blackness, the magnetite particles are usually required to be contained in the black magnetic toner in an amount of about 30 to about 50% by weight.

As described above, the insulated or high-resistance black magnetic toner is required to have an insulating property enough to retain a necessary charge amount thereon, especially show a volume resistivity of not less than $10^{12}$ Ω·cm. However, the black magnetic toner usually contains pigments such as carbon black, dyes, charge-controlling agents, etc., in addition to a binder resin and magnetic particles such as magnetite particles, resulting in reduction in charge amount of the black magnetic toner.

With respect to this fact, on pages 46 to 47 of "Optimum Design of Developers and Developing Process Techniques in Electrophotgraphy" published by Technical Information Institute, Co., Ltd. (1994), it has been described that "In developers of a contact-charging type, it is necessary that at least one of carrier and toner has an insulating property enough to retain the charge amount for such a period of time as required for the development. In general, since the toner image is required to have an electrostatic transfer property and a heat- (or pressure-) fixing property, it is preferred that the toner has an insulating property rather than the carrier (therefore, there exist upper limits concerning the mixing ratios of conductive pigments, carbon, magnetite, etc., which are mixed in the toner). Ordinary toners contain not only simple polymers but also other components such as pigments (e.g., carbon black), dyes, charge-controlling agents or the like. The charge amount of toner is usually reduced by adding conductive fine particles, carbon black or $Fe_3O4$ thereto. It is suspected that the reduction in charge amount of the toner is caused by a microscopic charge-removing effect at the contact portion".

Accordingly, in order to obtain a black magnetic toner having a volume resistivity as high as possible, it has been strongly desired to increase a volume resistivity of magnetite particles as highly as possible, which are contained in the toner in a large amount and normally have a low volume resistivity, especially about $1.0\times10^6$ to $5.0\times10^7$ Ω·cm.

On the other hand, various attempts have been made in order to improve a flowability of the black magnetic toner. For example, there have been known a method of adhering $SiO_2$ fine particles onto the surfaces of magnetite particles mixed and dispersed in black magnetic toner (Japanese Patent Application Laid-Open (KOKAI) Nos. 2-73362 (1990) and 6-130719(1994), etc.), a method of exposing a silicon compound to the surfaces of magnetite particles mixed and dispersed in black magnetic toner (Japanese Patent Publication (KOKOKU) No. 8-25747(1996), etc.), and the like.

Further, in order to improve a dispersibility of magnetite particles mixed and dispersed in black magnetic toner, it have also been known a method of treating the surfaces of the magnetite particles with an organosilicon compound such as methyl hydrogen polysiloxane (Japanese Patent Application Laid-Open (KOKAI) Nos. 3-43748(1991) and 53-81125(1978), etc.), and the like.

Thus, it has been most strongly demanded to provide black magnetic composite particles for black magnetic toner which have not only an excellent flowability but also a high volume resistivity. However, black magnetic toners which can satisfy such properties have not been provided.

That is, in the case of any of the above-mentioned conventional magnetite particles which have aimed at improving a flowability of the black magnetic toners, the $SiO_2$ fine particles adhered thereon tend to be fallen-off or desorbed from the surface of each magnetite particle when these magnetite particles are dispersed in a binder resin, as described in Comparative Examples hereinafter, so that the black magnetic toners cannot show a sufficient flowability. In addition, these magnetite particles have a volume resistivity as low as about $10^6$ to about $10^7$ Ω·cm, as described in Comparative Examples hereinafter. Further, as also described in Comparative Examples hereinafter, the magnetite particles described in Japanese Patent Application Laid-Open (KOKAI) No. 3-43748(1991) or the like, have not been improved in flowability, and the volume resistivity thereof is insufficient, i.e., about $10^7$ Ω·cm at most.

As a result of the present inventor's earnest studies for solving the above problems, it has been found that by causing fine particles comprising oxides and/or oxide hydroxides of at least one element selected from the group consisting of Si, Zr, Ti, Al and Ce, to adhere or exist on at least a part of the surface of each magnetite core particle, and then coating the surface of the fine particles adhered or existing on the surface of each magnetite particle or the surface of the fine particles adhered or existing on the surface of each magnetite particle and the exposed surface of each magnetite core particle, with methyl hydrogen polysiloxane, the obtained magnetic composite particles can show not only an excellent flowability, but also have a high volume resistivity. The present invention has been attained on the basis of the finding.

SUMMARY OF THE INVENTION

It is an object of the present invention to provide black magnetic composite particles for a black magnetic toner which show not only an excellent flowability but also a high volume resistivity.

It is an another object of the present invention to provide a black magnetic toner which show not only an excellent flowability but also a high volume resistivity.

To accomplish the aims, in a first aspect of the present invention, there is provided black magnetic composite particles for black magnetic toner, which comprise magnetite particles as core particles, fine particles which are adhered or exist on at least a part of the surface of each magnetite particle and which comprise oxides and/or oxide hydroxides of at least one element selected from the group consisting of Si, Zr, Ti, Al and Ce, and a methyl hydrogen polysiloxane coating layer formed on the fine particles or the fine particles and the exposed surface of each magnetite particle; and which have an average particle size of 0.08 to 1.0 μm.

In a second aspect of the present invention, there are provided black magnetic composite particles for black magnetic toner, comprising:

magnetite particle as core particle, wherein at least a part of the surface of said magnetite particle as a core particle is coated with at least one compound selected from the group consisting of hydroxides of aluminum, oxides of aluminum, hydroxides of silicon and oxides of silicon;

fine particles which are adhered or exist on at least a part of the surface of the coat composed of at least one compound selected from the group consisting of hydroxides of aluminum, oxides of aluminum, hydroxides of silicon and oxides of silicon or the surface of the coat composed of at least one compound selected from the group consisting of hydroxides of aluminum, oxides of aluminum, hydroxides of silicon and oxides of silicon and the exposed surface of the magnetite particle, and which comprise oxides, oxide hydroxides or oxides and oxide hydroxides composed of at least one element selected from the group consisting of Si, Zr, Ti, Al and Ce; and a methyl hydrogen polysiloxane coating layer formed on said fine particles or said fine particles and the exposed surface of the magnetite particle, the average particle size of said black magnetic composite particles being 0.08 to 1.0 $\mu$m.

In a third aspect of the present invention, there is provided a black magnetic toner comprising composite particles which comprise:

black magnetic composite particles for black magnetic toner, comprising magnetite particle as core particle, fine particles which are adhered or exist on at least a part of the surface of each magnetite particle, and comprise oxides, oxide hydroxides or oxides and oxide hydroxides composed of at least one element selected from the group consisting of Si, Zr, Ti, Al and Ce, and a methyl hydrogen polysiloxane coating layer formed on said fine particles or said fine particles and the exposed surface of the magnetite particle, the average particle size of said black magnetic composite particles being 0.08 to 1.0 $\mu$m; and a binder resin.

In a fourth aspect of the present invention, there is provided a black magnetic toner comprising composite particles which comprise:

black magnetic composite particles for black magnetic toner, comprising magnetite particle as core particle wherein at least a part of the surfaces of said magnetite particles as core particles is coated with at least one compound selected from the group consisting of hydroxides of aluminum, oxides of aluminum, hydroxides of silicon and oxides of silicon, fine particles which are adhered or exist on at least a part of the surface of the coat composed of at least one compound selected from the group consisting of hydroxides of aluminum, oxides of aluminum, hydroxides of silicon and oxides of silicon or the surface of the coat composed of at least one compound selected from the group consisting of hydroxides of aluminum, oxides of aluminum, hydroxides of silicon and oxides of silicon and the exposed surface of the magnetite particle, and which comprise oxides, oxide hydroxides or oxides and oxide hydroxides composed of at least one element selected from the group consisting of Si, Zr, Ti, Al and Ce, and a methyl hydrogen polysiloxane coating layer formed on said fine particles or said fine particles and the exposed surface of the magnetite particle, the average particle size of said black magnetic composite particles being 0.08 to 1.0 $\mu$m; and a binder resin.

In a fifth aspect of the present invention, there is provided a black magnetic toner comprising composite particles which comprise:

the black magnetic composite particles set forth in the first or second aspect; and a binder resin, the black magnetic composite particles existing inside the composite particle and at least a part of the black magnetic composite particles being exposed to the surface of the composite particle.

In a sixth aspect of the present invention, there is provided a black magnetic toner comprising composite particles which comprise:

the black magnetic composite particles set forth in the first or second aspect; and a binder resin, the black magnetic composite particles being existing in the surface of the composite particle.

In a seventh aspect of the present invention, there is provided a black magnetic toner comprising composite particles which comprise:

the black magnetic composite particles set forth in the first or second aspect; and a binder resin, a part of the black magnetic composite particles existing inside the composite particle wherein at least a part of the black magnetic composite particles is exposed to the surface of the composite particle, and a part of the black magnetic composite particles existing in the surface of the composite particle.

DETAILED DESCRIPTION OF THE INVENTION

Figure 1:
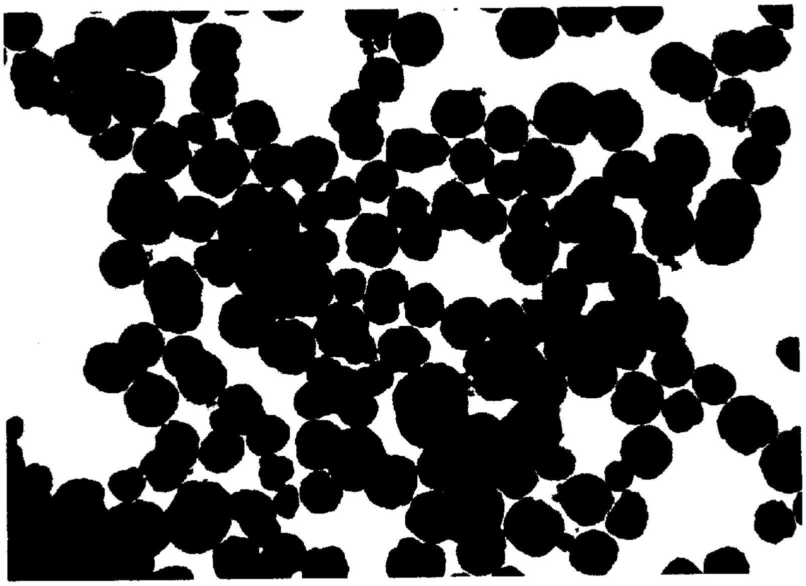
FIG. 1 is an electron micrograph (×30,000) showing a particle structure of spherical magnetite particles used in Example 1.

The present invention is now described in detail below.

First, the black magnetic composite particles according to the present invention are described.

The magnetite particles as core particles used in the present invention, are those particles represented by the general formula:

$FeO_x \cdot Fe_2O_3$ wherein x is more than 0 and not more than 1.

As the magnetite particles usable in the present invention, there may be exemplified isotropic particles having a ratio of average maximum diameter to average minimum diameter (hereinafter referred to merely as "sphericity") of less than 2:1, such as spherical particles, octahedral particles or hexahedral particles; or anisotropic particles having a ratio of average major axis diameter to average minor axis diameter (hereinafter referred to merely as "aspect ratio") of not less than 2, such as acicular particles, spindle-shaped particles or rice ball-like particles. In the consideration of the flowability of the obtained black magnetic composite particles, the isotropic particles are preferred. Among them, spherical magnetite particles having a sphericity of 1.0:1 to 1.3:1 are more preferred.

The upper limit of the aspect ratio of the anisotropic magnetite particles is preferably 20:1, more preferably 18:1, still more preferably 15:1.

When the aspect ratio of the anisotropic magnetite particles is more than 20:1, the particles tend to be frequently entangled or intertwined with each other, so that it becomes difficult to uniformly adhere the oxide fine particles and/or the oxide hydroxide fine particles onto the surface of each magnetite particle, and to form a uniform coating layer composed of methyl hydrogen polysiloxane thereon.

The magnetite particles according to the present invention, have an average particle size (an average major axis diameter in the case of anisotropic particles) of usually 0.055 to 0.95 $\mu$m, preferably 0.065 to 0.75 $\mu$m, more preferably 0.065 to 0.45 $\mu$m.

When the average particle size of the magnetite particles is more than 0.95 $\mu$m, the obtained black magnetic composite particles become coarse, so that the tinting strength thereof is deteriorated. On the other hand, when the average particle size of the magnetite particles is less than 0.055 $\mu$m, the intermolecular force between particles is increased due to the fineness thereof, so that the particles tend to be agglomerated together. As a result, it also becomes difficult to uniformly adhere the oxide fine particles and/or the oxide hydroxide fine particles onto the surface of each magnetite particle, and to form a uniform coating layer composed of methyl hydrogen polysiloxane thereon.

As to the particle size distribution of the magnetite particles, the geometrical standard deviation value thereof is preferably 1.01 to 2.0, more preferably 1.01 to 1.8, still more preferably 1.01 to 1.6. When the geometrical standard deviation value thereof is more than 2.0, coarse particles are contained therein, so that the particles are inhibited from being uniformly dispersed. As a result, it also becomes difficult to uniformly adhere the oxide fine particles and/or the oxide hydroxide fine particles onto the surface of each magnetite particle, and to form a uniform coating layer composed of methyl hydrogen polysiloxane thereon. It is industrially difficult to obtain particles having a geometrical standard deviation value of less than 1.01.

The BET specific surface area of the magnetite particles thereof is not less than 0.5 $m^2/g$. When the BET specific surface area is less than 0.5 $m^2/g$, the magnetite particles may become coarse particles, or the sintering between the particles may be caused, so that the obtained black magnetic composite particles also may become coarse particles and tend to be deteriorated in tinting strength. In the consideration of the tinting strength of the obtained black magnetic composite particles, the BET specific surface area of the magnetite particles is preferably not less than 1.0 $m^2/g$, more preferably not less than 3.0 $m^2/g$. The upper limit of the BET specific surface area of the magnetite particles, is usually 70 $m^2/g$. Further, in the consideration of uniformly adhering the oxide fine particles and/or the oxide hydroxide fine particles onto the surface of each magnetite particle, and forming a uniform coating layer composed of methyl hydrogen polysiloxane thereon, the upper limit of the BET specific surface area of the magnetite particles, is preferably 50 $m^2/g$, more preferably 30 $m^2/g$.

As to the fluidity of the magnetite particles, the fluidity index thereof is about 25 to about 43. Among the magnetite particles having various shapes, the spherical particles are excellent in fluidity, for example, the fluidity index thereof is about 30 to about 43.

As to the blackness of the magnetite particles, the lower limit thereof is usually 16.0 when represented by L* value, and the upper limit thereof is usually 26.0, preferably 25.0 when represented by L* value. When the L* value exceeds 26.0, the lightness of the particles is increased, so that it is difficult to obtain black magnetic composite particles having a sufficient blackness.

The volume resistivity of the magnetite particles is usually about $1.0 \times 10^6$ to about $5.0 \times 10^7$ $\Omega \cdot cm$.

The magnetic properties of the magnetite particles may be variously controlled by appropriately selecting kind and particle shape of magnetite particles used, kind of elements other than Fe contained in the magnetite particles, or the like. As to the magnetic properties of the magnetite particles, the coercive force value thereof is usually about 10 to about 350 Oe, preferably 20 to about 330 Oe; the saturation magnetization value in a magnetic field of 10 kOe is usually about 40 to about 100 emu/g, preferably about 50 to about 90 emu/g; and the residual magnetization value in a magnetic field of 10 kOe is usually about 1 to about 35 emu/g, preferably about 3 to about 30 emu/g.

As the oxide fine particles and/or the oxide hydroxide fine particles existing between at least a part of the surface of each magnetite particle and the coating layer composed of methyl hydrogen polysiloxane, there can be used such fine particles capable of uniformly adhering or existing onto the surface of each magnetite particle without deteriorating the blackness thereof, i.e., non-magnetic or paramagnetic fine particles which are transparent and free from being magnetically agglomerated. As such fine particles, there may be exemplified fine particles composed of an oxide and/or an oxide hydroxide of at least one element selected from the group consisting of Si, Zr, Ti, Al and Ce (hereinafter referred to merely as "fine particles").

As such fine particles, there may be used synthesized products or commercially available colloid solutions containing fine particles. As the commercially available colloid solutions containing fine particles, there may be exemplified those colloid solutions containing fine particles composed of silicon dioxide, zirconium oxide, zirconium oxide hydroxide, titanium dioxide, aluminum oxide, hydrated alumina, cerium dioxide or the like.

The average particle size of the fine particles is usually 0.001 to 0.05 $\mu$m, preferably 0.002 to 0.045 $\mu$m.

When the average particle size of the fine particles is less than 0.001 $\mu$m, appropriate irregularities cannot be formed on the surfaces of the obtained black magnetic composite particles due to too much fineness of the fine particles, so that the flowability of the black magnetic composite particles cannot be sufficiently improved. Further, the handling property or workability of the fine particles is deteriorated.

On the other hand, when the average particle size of the fine particles is more than 0.05 μm, the particle size of the fine particles becomes too larger as compared to that of the magnetite particles, so that there is a tendency that the fine particles cannot be sufficiently adhered onto the surfaces of the magnetite particles.

The ratio of the average particle size of the magnetite particles to that of the fine particles is preferably not less than 2:1, more preferably not less than 5:1. When the ratio is less than 2:1, the particle size of the fine particles becomes too larger as compared to that of the magnetite particles, so that there is a tendency that the fine particles cannot be sufficiently adhered onto the surfaces of the magnetite particles. The upper limit thereof is preferably 100:1.

The amount of the fine particles adhered or existing on at least a part of the surface of each magnetite particle is usually 0.5 to 50% by weight, preferably 1.0 to 45% by weight (calculated as $SiO_2$, $ZrO_2$, $TiO_2$, $Al_2O_3$ or $CeO_2$) based on the weight of the magnetite particles.

When the amount of the fine particles is less than 0.5% by weight, the obtained black magnetic composite particles cannot show a sufficient flowability due to the lack of amount of the fine particles adhered or existing on the surface of each magnetite particle.

On the other hand, when the amount of the fine particles is more than 50% by weight, the obtained black magnetic composite particles can show a sufficient flowability. However, the fine particles tend to be fallen-off or desorbed from the surfaces of the black magnetic composite particles, so that the dispersibility of the black magnetic composite particles in a binder resin is deteriorated upon the production of black magnetic toner.

The kind of fine particles used may be appropriately selected in order to impart a good charging property to the obtained black magnetic toner. Namely, the fine particles can be charged to various negative or positive potentials according to kinds thereof.

The methyl hydrogen polysiloxane used in the present invention, is represented by the following general formula:

$$(CH_3HSiO)_n((CH_3)_3SiO_{1/2})_2$$

wherein n is 10 to 830.

Thus, the methyl hydrogen polysiloxane has an Si-H reactive group within its molecule. Since the methyl hydrogen polysiloxane exhibits a transparency, the blackness of the magnetite particles can be prevented from being adversely affected thereby, so that the obtained black magnetic composite particles can show substantially the same blackness as that of the magnetite particles as core particles.

In the consideration of forming a uniform coating layer composed of the methyl hydrogen polysiloxane, the "n" in the above general formula is preferably 14 to 450, more preferably 20 to 325. Specific examples of the methyl hydrogen polysiloxane may include commercially available products such as TSF484 (molecular weight: about 3,500) and TSF483 (molecular weight: about 9,200) (tradenames; both produced by Toshiba Silicone Co., Ltd.), or the like.

The coating amount of methyl hydrogen polysiloxane is preferably 0.1 to 50% by weight, more preferably 0.2 to 40% by weight, still more preferably 0.5 to 30% by weight (calculated as $SiO_2$) based on the weight of the magnetite particles on the surfaces of which the fine particles are adhered or exist.

When the coating amount of methyl hydrogen polysiloxane is less than 0.1% by weight, the magnetite particles on the surfaces of which the fine particles are adhered or exist, cannot be sufficiently coated with the methyl hydrogen polysiloxane, so that the fine particles tend to be fallen-off or desorbed from the surfaces of the magnetite particles, thereby failing to obtain a black magnetic toner having an excellent flowability. Further, the fine particles which are not coated with methyl hydrogen polysiloxane, are exposed to the surface of the composite particle, resulting in reduction in volume resistivity of the obtained black magnetic toner.

On the other hand, when the coating amount of methyl hydrogen polysiloxane is more than 50% by weight, clear irregularities cannot be formed on the surfaces of the black magnetic composite particles, so that the flowability of the obtained black magnetic toner is deteriorated. Further, since the effect of increasing the volume resistivity is already saturated, the use of such a large coating amount of methyl hydrogen polysiloxane is meaningless.

The particle shape and particle size of the black magnetic composite particles according to the present invention are considerably varied depending upon those of the magnetite particles as core particles. The black magnetic composite particles have a similar particle shape to that of the magnetite particle as core particle, and a slightly larger particle size than that of the magnetite particles as core particles.

More specifically, the obtained black magnetic composite particles according to the present invention, have an average particle size in the case of the isotropic magnetite particles as core particles (average major axis diameter in case of anisotropic magnetite particles), of usually 0.06 to 1.0 μm, preferably 0.07 to 0.8 μm, more preferably 0.07 to 0.5 μm.

When the anisotropic magnetite particles are used as core particles, the upper limit of the aspect ratio of the black magnetic composite particles according to the present invention, is usually 20:1, preferably 18:1, more preferably 15:1.

The geometrical standard deviation value of the black magnetic composite particles according to the present invention is preferably not more than 2.0, more preferably 1.01 to 1.8, still more preferably 1.01 to 1.6. The lower limit of the geometrical standard deviation value thereof is preferably 1.01. When the geometrical standard deviation value thereof is more than 2.0, the tinting strength of the black magnetic composite particles is likely to be deteriorated due to the existence of coarse particles therein. It is industrially difficult to obtain such particles having a geometrical standard deviation of less than 1.01.

The BET specific surface area of the black magnetic composite particles according to the present invention, is usually not less than 0.5 $m^2/g$, preferably not less than 1.0 $m^2/g$, more preferably not less than 3.0 $m^2/g$. When the BET specific surface area thereof is less than 0.5 $m^2/g$, the obtained black magnetic composite particles may be coarse, and the sintering between the black magnetic composite particles is caused, thereby deteriorating the tinting strength. The upper limit thereof is usually 100 $m^2/g$. When the BET specific surface area is more than 100 $m^2/g$, the black magnetic composite particles tend to be agglomerated together by the increase in intermolecular force due to the reduction in particle size, thereby deteriorating the dispersibility in a binder resin upon production of the magnetic toner. In the consideration of the dispersibility in a binder resin upon production of the magnetic toner, the upper limit is preferably 90 $m^2/g$, more preferably 80 $m^2/g$.

As to the fluidity of the black magnetic composite particles according to the present invention, the fluidity index thereof is preferably 47 to 70, more preferably 48 to 70, still more preferably 49 to 70. When the fluidity index thereof is less than 47, the fluidity of the black magnetic composite particles becomes insufficient, thereby failing to improve the fluidity of the finally obtained magnetic toner. Further, in the production process of the magnetic toner, there tend to be caused defects such as clogging of hopper, etc., thereby deteriorating the handling property or workability.

As to the blackness of the black magnetic composite particles according to the present invention, the upper limit of the blackness of the black magnetic composite particles is usually 27.0, preferably 26.0, more preferably 25.0 when represented by L* value. When the L* value thereof is more than 27.0, the lightness of the black magnetic composite particles becomes high, so that the black magnetic composite particles having a sufficient blackness cannot be obtained. The lower limit of the blackness thereof is usually 16.0 when represented by L* value.

The volume resistivity of the black magnetic composite particles is usually not less than $1.0\times10^8$ Ω·cm, preferably about $5.0\times10^8$ to about $5.0\times10^{11}$ Ω·cm. When the volume resistivity of the black magnetic composite particles is less than $1.0\times10^8$ Ω·cm, the obtained black magnetic toner is disadvantageously deteriorated in volume resistivity.

The dispersibility of the black magnetic composite particles is not less than 4, more preferably 5 when evaluated by the 5-rank evaluation method described in detail hereinafter.

As to the magnetic properties of the black magnetic composite particles, the coercive force value, the saturation magnetization value and the residual magnetization value thereof are substantially the same as those of the above-mentioned magnetite particles.

In the black magnetic composite particles according to the present invention, at least a part of the surface of the magnetite particle as core particle may be preliminarily coated with at least one compound selected from the group consisting of hydroxides of aluminum, oxides of aluminum, hydroxides of silicon and oxides of silicon (hereinafter referred to as "coating composed of hydroxides and/or oxides of aluminum and/or silicon"). In this case, the obtained black magnetic composite particles can show a higher dispersibility in a binder resin as compared to in the case where the magnetite particles are uncoated with hydroxides and/or oxides of aluminum and/or silicon.

The coating amount of the hydroxides and/or oxides of aluminum and/or silicon is preferably 0.01 to 50% by weight (calculated as Al, $SiO_2$ or a sum of Al and $SiO_2$) based on the weight of the magnetite particles as core particles.

When the coating amount of the hydroxides and/or oxides of aluminum and/or silicon is less than 0.01% by weight, the effect of enhancing the dispersibility of the obtained black magnetic composite particles in a binder resin upon the production of magnetic toner cannot be obtained.

On the other hand, when the coating amount of the hydroxides and/or oxides of aluminum and/or silicon is more than 50% by weight, the obtained black magnetic composite particles can exhibit a good dispersibility in a binder resin upon the production of magnetic toner. However, the use of such unnecessarily large coating amount of the hydroxides and/or oxides of aluminum and/or silicon is meaningless.

The particle size, geometrical standard deviation, BET specific surface area, fluidity, blackness L* value, volume resistivity and magnetic properties of the black magnetic composite particles wherein at least a part of the surface of the core particle is coated with the hydroxides and/or oxides of aluminum and/or silicon according to the present invention, are substantially the same as those of the black magnetic composite particles wherein the core particle is uncoated with the hydroxides and/or oxides of aluminum and/or silicon according to the present invention.

Next, the black magnetic toner according to the present invention is described.

The black magnetic toner according to the present invention comprises composite particles comprising the black magnetic composite particles and a binder resin. The composite particles may further contain a mold release agent, a colorant, a charge-controlling agent and other additives, if necessary.

The composite particles according to the present invention have an average particle size of usually 3 to 15 μm, preferably 5 to 12 μm.

As to the composite particles for black magnetic toner according to the present invention, there may be exemplified:

composite particles (1) wherein the black magnetic composite particles exist (are contained) inside the composite particle in which at least a part of the black magnetic composite particles contained therein is exposed to the surface of the composite particle (forms a part of the surface of the composite particle);

composite particles (2) wherein the black magnetic composite particles exist in and/or are adhered on the surface of the composite particle (form at least a part of the surface of the composite particle), and magnetite particles may exist (are contained) inside the composite particle;

composite particles (3) wherein a part of the black magnetic composite particles exists (is contained) inside the composite particle in which at least a part of the black magnetic composite particles contained therein is exposed to the surface of the composite particle (forms a part of the surface of the composite particle), and a part of the black magnetic composite particles exists in and/or is adhered on the surface of the composite particle (forms at least a part of the surface of the composite particle); and a mixed particles composed of at least two of the composite particles (1), (2) and (3).

The composite particles according to the present invention may further contain and/or have magnetite particles in addition to the black composite particles according to the present invention, in such an amount as not to deteriorate properties of the obtained composite particles.

In case of the composite particles (1) for black magnetic toner, the amount of the binder resin used is usually 50 to 800 parts by weight, preferably 50 to 400 parts by weight based on 100 parts by weight of the black magnetic composite particles. When the amount of the binder resin used is less than 50 parts by weight, a mixture of the black magnetic composite particles and the binder resin cannot be sufficiently kneaded together due to too small amount of the binder resin relative to that of the black magnetic composite particles, thereby failing to obtain good composite particles. On the other hand, when the amount of the binder resin is more than 800 parts by weight, the tinting strength of the composite particles is deteriorated because the amount of the binder resin is too large relative to that of the black magnetic composite particles, thereby reducing the amount of the black magnetic composite particles which are exposed to the surface of the composite particle. Alternatively, the amount of the black magnetic composite particles used is preferably 10 to 80% by weight, more preferably 30 to 60% by weight based on the weight of the composite particles (1).

Alternatively, in case of the composite particles (1), even though among 100 parts by weight of the black magnetic composite particles, less than 50 parts by weight, preferably not more than 45 parts by weight, more preferably not more than 40 parts by weight of the black magnetic composite particles are substituted with magnetite particles, the aimed black magnetic toner can also be obtained.

In the composite particles (2) for black magnetic toner, the amount of the black magnetic composite particles used is usually 0.1 to 9 parts by weight, preferably 0.5 to 5 parts by weight based on 100 parts by weight of the composite particles (2). When the amount of black magnetic composite particles used is less than 0.1 part by weight, the flowability of the obtained black magnetic toner cannot be improved. On the other hand, when the amount of the black magnetic composite particles used is more than 10 parts by weight, since the effect of improving the flowability is already saturated, the use of such a large amount of the black magnetic composite particles is meaningless.

In case of the composite particles (2), the magnetite particles may be contained therewithin preferably 10 to 80% by weight more preferably 30 to 65% by weight based on the weight of the composite particles (2).

In case of the composite particles (3) for black magnetic toner, the amount of the black magnetic composite particles contained therein is substantially the same as that used in the above-mentioned composite particles (1) and the amount of the black magnetic composite particles adhered and/or existing on the surfaces thereof is substantially the same as that used in the above-mentioned composite particles (2). Further, a part of the black magnetic composite particles may be substituted with the same amount of the magnetite particles as that used in each composite particles (1) and (2).

As the binder resins, there may be used vinyl-based polymers, i.e., homopolymers or copolymers of vinyl-based monomers such as styrene, alkyl acrylates and alkyl methacrylates. As the styrene monomers, there may be exemplified styrene and substituted styrenes. As the alkyl acrylate monomers, there may be exemplified acrylic acid, methyl acrylate, ethyl acrylate, butyl acrylate or the like.

It is preferred that the above copolymers contain styrene-based components in an amount of usually 50 to 95% by weight.

In the binder resin used in the present invention, the above-mentioned vinyl-based polymers may be used in combination with polyester-based resins, epoxy-based resins, polyurethane-based resins or the like, if necessary.

As to the flowability of the black magnetic toner according to the present invention, the flowability index thereof is usually 70 to 100, preferably 75 to 100. Especially, in the case where the black magnetic toner are composed of such composite particles (3) within which the black magnetic composite particles exist and on the surfaces of which the black magnetic composite particles are adhered and/or exist, the obtained black magnetic toner can show a more excellent flowability, i.e., a flowability index of 80 to 100. When the flowability index is less than 70, the flowability of the obtained black magnetic toner becomes insufficient.

The blackness of the black magnetic toner according to the present invention is usually not more than 40.0, preferably not more than 35.0, more preferably not more than 30.0 when represented by L* value. When the blackness thereof is more than 40.0, the lightness of the black magnetic toner may be increased, resulting in insufficient blackness. The lower limit of the blackness of the black magnetic toner is usually about 16.0 when represented by L* value.

The black magnetic toner according to the present invention, exhibits a volume resistivity of usually not less than $1.0\times10^{13}$ Ω·cm, preferably not less than $1.0\times10^{14}$ Ω·cm. In particular, in the case where the black magnetic toner according to the present invention are composed of such composite particles (3) within which the black magnetic composite particles exist and on the surfaces of which the black magnetic composite particles are adhered and/or exist, the obtained black magnetic toner can show a higher volume resistivity, i.e., preferably not less than $5.0\times10^{14}$ Ω·cm. When the volume resistivity of the black magnetic toner is less than $1.0\times10^{13}$ Ω·cm, the charge amount of the black magnetic toner tend to be varied according to environmental conditions upon use of the toner, so that the characteristics thereof becomes unstable. The volume resistivity of the black magnetic toner is preferably less than $10^{17}$ Ω·cm.

As to the magnetic properties of the black magnetic toner according to the present invention, the coercive force thereof is usually 10 to 350 Oe, preferably 20 to 330 Oe; the saturation magnetization value in a magnetic field of 10 kOe is usually 10 to 90 emu/g, preferably 20 to 85 emu/g; the residual magnetization in a magnetic field of 10 kOe is usually 1 to 20 emu/g, preferably 2 to 15 emu/g; the saturation magnetization in a magnetic field of 1 kOe is usually 7.5 to 65 emu/g, preferably 10 to 60 emu/g; and the residual magnetization in a magnetic field of 1 kOe is usually 0.5 to 15 emu/g, preferably 1.0 to 13 emu/g.

The black magnetic composite particles according to the present invention can be produced by the following method.

Among the isotropic magnetite particles, (i) octahedral magnetite particles can be produced by passing an oxygen-containing gas through a suspension containing ferrous hydroxide colloid having a pH value of not less than 10, which is obtained by reacting an aqueous ferrous salt solution with an aqueous alkali solution having a concentration of not less than one equivalent based on $Fe^{2+}$ in the aqueous ferrous salt solution, thereby precipitating magnetite particles, and then subjecting the obtained magnetite particles to filtering, washing with water and drying (Japanese Patent Publication (KOKOKU) No. 44-668 (1969); (ii) hexahedral magnetite particles can be produced by passing an oxygen-containing gas through a suspension containing ferrous hydroxide colloid having a pH value of 6.0 to 7.5, which is obtained by reacting an aqueous ferrous salt solution with an aqueous alkali solution having a concentration of not more than one equivalent based on $Fe^{2+}$ in the aqueous ferrous salt solution to produce magnetite core particles, further passing an oxygen-containing gas through the obtained aqueous ferrous salt reaction solution containing the magnetite core particles and the ferrous hydroxide colloid, at a pH value of 8.0 to 9.5, to precipitate magnetite particles, and then subjecting the precipitated magnetite particles to filtering, washing with water and drying (Japanese Patent Application Laid-Open (KOKAI) No. 3-201509(1991); (iii) spherical magnetite particles can be produced by passing an oxygen-containing gas through a suspension containing ferrous hydroxide colloid having a pH value of 6.0 to 7.5, which is obtained by reacting an aqueous ferrous salt solution with an aqueous alkali solution having a concentration of not more than one equivalent based on $Fe^{2+}$ in the aqueous ferrous salt solution to produce magnetite core particles, adding alkali hydroxide in an amount of not less than equivalent based on the remaining $Fe^{2+}$ to adjust the pH value of the suspension to not less than 10, heat-oxidizing the resultant suspension to precipitate magnetite particles, and then subjecting the precipitated magnetite particles to filtering, washing with water and drying (Japanese Patent Publication (KOKOKU) No. 62-51208(1987).

The anisotropic magnetite particles can be produced by passing an oxygen-containing gas through a suspension containing either ferrous hydroxide colloid, iron carbonate, or an iron-containing precipitate obtained by reacting an aqueous ferrous salt solution with alkali hydroxide and/or alkali carbonate, while appropriately controlling the pH value and temperature of the suspension, to produce acicular, spindle-shaped or rice ball-shaped goethite particles, subjecting the obtained goethite particles to filtering, washing with water and drying, and, if necessary, by heat-dehydrating the goethite particles in air at 400 to 800° C. and then heat-reducing the dehydrated particles in a reducing gas such as hydrogen gas or the like, at 300 to 500° C.

The adhesion or deposition of the fine particles on the surfaces of the magnetite particles may be conducted by mechanically mixing and stirring magnetite particles together with a colloid solution containing fine particles composed of an oxide or an oxide hydroxide of Si, Zr, Ti, Al or Ce, and then drying the obtained particles.

As the colloid solution containing silicon oxide fine particles or silicon oxide hydroxide fine particles, there may be exemplified Snowtex-XS, Snowtex-SS, S Snowtex-UP, Snowtex-20, Snowtex-30, Snowtex-40, Snowtex-C, Snowtex-N, Snowtex-O, Snowtex-S, Snowtex-20L, Snowtex-OL (tradenames, produced by Nissan Kagaku Kogyo, Co., Ltd.) or the like. In the consideration of the effect of improving the flowability of the obtained black magnetic composite particles, Snowtex-XS, Snowtex-SS and Snowtex-UP are preferred.

As the colloid solution containing zirconium oxide fine particles or zirconium oxide hydroxide fine particles, there may be exemplified NZS-20A, NZS-30A, NZS-30B (tradenames, produced by Nissan Kagaku Kogyo, Co., Ltd.) or the like.

As the colloid solution containing titanium oxide fine particles or titanium oxide hydroxide fine particles, there may be exemplified STS-01, STS-02 (tradenames, produced by Ishihara Sangyo, Co., Ltd.) or the like.

As the colloid solution containing aluminum oxide fine particles or aluminum oxide hydroxide fine particles, there may be exemplified AS-100, AS-200, AS-520 (tradenames, produced by Nissan Kagaku Kogyo, Co., Ltd.) or the like.

As the colloid solution containing cerium oxide fine particles or cerium oxide hydroxide fine particles, there may be exemplified a solution of Ceria-sol (produced by Nissan Kagaku Kogyo, Co., Ltd.) or the like.

The amount of the fine particles contained in the colloid solution added, is preferably 0.5 to 50% by weight (calculated as $SiO_2$, $ZrO_2$, $TiO_2$, $A1_2O_3$ or $CeO_2$) based on the weight of the magnetite particles. When the amount of the fine particles added is less than 0.5% by weight, the amount of the fine particles existing in the magnetite particles is insufficient, so that it is difficult to sufficiently enhance the flowability of the obtained black magnetic composite particles. On the other hand, when the amount of the fine particles added is more than 50% by weight, although the flowability of the obtained black magnetic composite particles can be improved sufficiently, the fine particles tend to be fallen-off or desorbed from the surfaces of the magnetite particles, so that the dispersibility of the black magnetic composite particles in binder resin is deteriorated upon production of the black magnetic toner.

In order to cause the fine particles to uniformly exist on the surface of each magnetite particle, it is preferred that aggregates of magnetite particles be previously deagglomerated by using a pulverizer. As apparatuses used for the mixing and stirring, there may be exemplified an edge runner, a Henschel mixer or the like.

The mixing and stirring conditions such as amounts of respective particles added, linear load, stirring velocity, mixing and stirring time, etc., may be appropriately selected such that the fine particles are allowed to adhere or exist on the surface of each magnetite particle as uniformly as possible. The mixing and stirring time is preferably not less than 20 minutes.

The coating treatment of the magnetite particles on the surfaces of which the fine particles are adhered or exist, or on the surfaces of which the fine particles are adhered or exist and the exposed surface of the magnetite particle, with the methyl hydrogen polysiloxane, may be conducted by mechanically mixing and stirring the magnetite particles on the surfaces of which the fine particles are adhered or exist, together with the methyl hydrogen polysiloxane solution, or by mechanically mixing and stirring the magnetite particles on the surfaces of which the fine particles are adhered or exist, together with the methyl hydrogen polysiloxane while spraying the methyl hydrogen polysiloxane over the magnetite particles. A substantially whole amount of the methyl hydrogen polysiloxane added can be used to coat the surfaces of the magnetite particles on which the fine particles are adhered or exist, or the surfaces of which the fine particles are adhered or exist and the exposed surface of the magnetite particle.

The mixing and stirring conditions for the coating treatment, such as amounts of respective components added, linear load, stirring velocity, mixing and stirring time, etc., may be appropriately selected such that the magnetite particle on the surfaces of which the fine particles are adhered or exist, are coated with the methyl hydrogen polysiloxane as uniformly as possible. The mixing and stirring time is preferably not less than 20 minutes.

After completion of coating the magnetite particles on the surfaces of which the fine particles are adhered or exist, or on the surfaces of which the fine particles are adhered or exist and the exposed surface of the magnetite particle, with methyl hydrogen polysiloxane, the resultant particles are dried, thereby obtaining black magnetic composite particles.

In advance of allowing the fine particles to adhere or exist on the surfaces of the magnetite particles, the magnetite particles may be optionally coated with at least one compound selected from the group consisting of hydroxides of aluminum, oxides of aluminum, hydroxides of silicon and oxides of silicon.

The coating of the hydroxides and/or oxides of aluminum and/or silicon may be conducted by adding an aluminum compound, a silicon compound or both the compounds to a water suspension in which the magnetite particles are dispersed, followed by mixing and stirring, and further adjusting the pH value of the suspension, if required, thereby coating at least a part of the surfaces of the magnetite particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate, or the like.

The amount of the aluminum compound added is 0.01 to 50% by weight (calculated as Al) based on the weight of the magnetite particles. When the amount of the aluminum compound added is less than 0.01% by weight, it may be difficult to sufficiently coat the surfaces of the magnetite particles with hydroxides and/or oxides of aluminum, thereby failing to achieve the improvement of the dispersibility in the binder resin upon the production of the magnetic toner. On the other hand, when the amount of the aluminum compound added is more than 50% by weight, the coating effect is saturated and, therefore, it is meaningless to add such an excess amount of the aluminum compound.

As the silicon compounds, there may be exemplified #3 water glass, sodium orthosilicate, sodium metasilicate, or the like.

The amount of the silicon compound added is 0.01 to 50% by weight (calculated as $SiO_2$) based on the weight of the magnetite particles. When the amount of the silicon compound added is less than 0.01% by weight, it may be difficult to sufficiently coat the surfaces of the magnetite particles with hydroxides and/or oxides of silicon, thereby failing to achieve the improvement of the dispersibility in the binder resin upon the production of the magnetic toner. On the other hand, when the amount of the silicon compound added is more than 50% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50% by weight (calculated as a sum of Al and $SiO_2$) based on the weight of the magnetite particles.

Next, the process for producing the black magnetic toner according to the present invention is described.

The black magnetic toner according to the present invention which is composed of the composite particles (1) wherein the black magnetic composite particles exist therein and wherein a part of the black magnetic composite particles contained therein is exposed to the surface thereof, may be produced by a known method of first mixing and kneading a predetermined amount of a binder resin with a predetermined amount of the black magnetic composite particles, and then pulverizing the resultant mixture. More specifically, the black magnetic composite particles and the binder resin are intimately mixed together with, if necessary, a mold release agent, a colorant, a charge-controlling agent or other additives by using a mixer. The obtained mixture is then melted and kneaded by a heating kneader so as to render the respective components compatible with each other, thereby dispersing the black magnetic composite particles, etc., therein. Successively, the molten mixture is cooled and solidified to obtain a resin mixture. The obtained resin mixture is then pulverized and classified, thereby producing a black magnetic toner having an aimed particle size.

As the mixers, there may be used a Henschel mixer, a ball mill or the like. As the heating kneaders, there may be used a roll mill, a kneader, a twin-screw extruder or the like. The pulverization of the mixed product may be conducted by using pulverizers such as a cutter mill, a jet mill or the like. The classification of the pulverized particles may be conducted by known methods such as air classification, etc., as described in Japanese Patent No. 2683142 or the like.

As the other method of producing the black magnetic toner, there may be exemplified a suspension polymerization method or an emulsion polymerization method. In the suspension polymerization method, polymerizable monomers and the black magnetic composite particles are intimately mixed together with, if necessary, a colorant, a polymerization initiator, a cross-linking agent, a charge-controlling agent or the other additives and then the obtained mixture is dissolved and dispersed together so as to obtain a monomer composition. The obtained monomer composition is added to a water phase containing a suspension stabilizer while stirring, thereby granulating and polymerizing the composition to form magnetic toner particles having an aimed particle size.

In the emulsion polymerization method, the monomers and the black magnetic composite particles are dispersed in water together with, if necessary, a colorant, a polymerization initiator or the like and then the obtained dispersion is polymerized while adding an emulsifier thereto, thereby producing magnetic toner particles having an aimed particle size.

The black magnetic toner according to the present invention which are composed of the composite particles (2) on the surfaces of which the black magnetic composite particles are adhered or exist, may be produced by a known method of mixing a predetermined amount of the composite particles with a predetermined amount of the black magnetic composite particles. More specifically, the black magnetic composite particles and the composite particles are intimately mixed together by using a mixer, thereby producing an aimed black magnetic toner. As the mixers, there may be used a Henschel mixer, a ball mill or the like.

The black magnetic toner according to the present invention which are composed of the composite particles (3) wherein the black magnetic composite particles exist therein and a part of the black magnetic composite particles contained therein is exposed to the surface thereof, and wherein the black magnetic composite particles are adhered or exist on the surface thereof, may be produced by the above-mentioned processes of the composite particles (1) and (2).

The important point of the present invention lies in such a fact that the black magnetic composite particles which have an average particle size of 0.08 to 1.0 $\mu$m, and in which the fine particles exist between the surface of each magnetite particle or the surface of the coating layer which is formed on the surface of each magnetite particle and composed of at least one compound selected from the group consisting of hydroxides of aluminum, oxides of aluminum, hydroxides of silicon and oxides of silicon, and the methyl hydrogen polysiloxane coating layer disposed on either of the surfaces, can show not only an excellent flowability but also a high volume resistivity.

The reason why the black magnetic composite particles according to the present invention can show an excellent flowability, is considered as follows. That is, a large number of the fine particles are uniformly adhered onto the surface of each magnetite particle, thereby forming many fine irregularities thereon.

The reason why the black magnetic composite particles according to the present invention can exhibit a high volume resistivity, is considered as follows. That is, due to the fact that black magnetic composite particles having a high volume resistivity cannot be obtained in any of the cases where only the fine particles exist on the surface of each magnetite particle, where only the methyl hydrogen polysiloxane coating layer exist on the surface of each magnetite particle, where the fine particles are adhered or exist on the surface of the methyl hydrogen polysiloxane coating layer formed on the surface of each magnetite particle, and where a specific amount of the fine particles exist between the surface of each magnetite particle and the methyl hydrogen polysiloxane coating layer but the amount of methyl hydrogen polysiloxane applied is insufficient so that the fine particles are not completely covered with the methyl hydrogen polysiloxane coating layer, it is considered that there exists a synergistic effect based on the specific amount of methyl hydrogen polysiloxane and the fine particles coated with the methyl hydrogen polysiloxane.

Incidentally, in the black magnetic composite particles according to the present invention, since the fine particles and the methyl hydrogen polysiloxane are transparent, the blackness of the magnetite particles as core particles are not adversely affected by these components. As a result, the obtained black magnetic composite particles can show substantially the same blackness as that of the magnetite particles.

Since the black magnetic composite particles according to the present invention exhibit not only an excellent flowability but also a high volume resistivity, the composite particles are suitable as black magnetic composite particles for black magnetic toner capable of attaining a high image quality and a high copying speed.

In addition, since the black magnetic composite particles according to the present invention, are excellent in flowability, the particles can show excellent handling property and workability and, therefore, are preferable from an industrial viewpoint.

Further, the black magnetic toner produced from the above black magnetic composite particles which show an excellent flowability and a high volume resistivity, can also show an excellent flowability and a high volume resistivity. Accordingly, the black magnetic toner is suitable as black magnetic toner capable of attaining a high image quality and a high copying speed.

EXAMPLES

The present invention is described in more detail by Examples and Comparative Examples, but the Examples are only illustrative and, therefore, not intended to limit the scope of the present invention.

Various properties were measured by the following methods.

(1) The average particle size, the average major axis diameter and average minor axis diameter of magnetite particles and black magnetic composite particles were respectively expressed by the average of values (measured in a predetermined direction) of about 350 particles which were sampled from a micrograph obtained by magnifying an original electron micrograph (×20,000) by four times in each of the longitudinal and transverse directions.

(2) The aspect ratio of the particles was expressed by the ratio of average major axis diameter to average minor axis diameter thereof. The sphericity is expressed by a ratio of maximum diameter to minimum diameter of the isotropic core particles.

(3) The geometrical standard deviation of particle sizes was expressed by values obtained by the following method. That is, the particle sizes (major axis diameters) were measured from the above magnified electron micrograph. The actual particle sizes (major axis diameters) and the number of the particles were calculated from the measured values. On a logarithmic normal probability paper, the particle sizes (major axis diameters) were plotted at regular intervals on the abscissa-axis and the accumulative number (under integration sieve) of particles belonging to each interval of the particle sizes (major axis diameters) were plotted by percentage on the ordinate-axis by a statistical technique.

The particle sizes (major axis diameters) corresponding to the number of particles of 50% and 84.13%, respectively, were read from the graph, and the geometrical standard deviation was calculated from the following formula:

Geometrical standard deviation={particle size (major axis diameters) corresponding to 84.13% under integration sieve}/{particle size (major axis diameters) (geometrical average diameter) corresponding to 50% under integration sieve}

The closer to 1 the geometrical standard deviation value, the more excellent the particle size distribution.

(4) The specific surface area was expressed by the value measured by a BET method.

(5) The amounts of Al and/or Si coated onto the surface of each magnetite particle, the amounts of Si, Al, Ti, Zr and Ce existing on the surface of each magnetite particle, and the amount of Si contained in methyl hydrogen polysiloxane coated onto the surface of each magnetite particle, were measured by a fluorescent X-ray spectroscopy device "3063M Model" (manufactured by Rigaku Denki Kogyo Co., Ltd.) according to JIS K0119 "General rule of fluorescent X-ray analysis".

Incidentally, the respective amounts of Si contained in oxides of silicon, hydroxides of silicon, silicon oxide fine particles, silicon oxide hydroxide fine particles and methyl hydrogen polysiloxane coated or existing on the surface of each core particle, are each expressed by a value obtained by subtracting an amount of Si measured before each treatment from the amount of Si measured after the treatment. Further, the respective amounts of Al contained in hydroxides of aluminum, oxides of aluminum, aluminum oxide fine particles and aluminum oxide hydroxide fine particles coated or existing on the surface of each core particle, are also expressed by values obtained in the same manner as above.

(6) The fluidity of magnetite particles, black magnetic composite particles and black magnetic toner was expressed by a fluidity index which was a sum of indices obtained by converting on the basis of the same reference measured values of an angle of repose, a degree of compaction (%), an angle of spatula and a degree of agglomeration as particle characteristics which were measured by a powder tester (tradename, produced by Hosokawa Micron Co., Ltd.). The closer to 100 the fluidity index, the more excellent the fluidity of the particles.

(7) The blackness of magnetite particles, black magnetic composite particles and black magnetic toner was measured by the following method. That is, 0.5 g of sample particles and 1.5 cc of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil applicator to produce a coating film piece (having a film thickness of about 30 $\mu$m). The thus obtained coating film piece was measured according to JIS Z 8729 by a multi-light source spectrographic calorimeter MSC-IS-2D (manufactured by Suga Testing Machines Manufacturing Co., Ltd.) to determine an L* value of calorimetric indices thereof. The blackness was expressed by the L* value measured.

Here, the L* value represents a lightness, and the smaller the L* value, the more excellent the blackness.

(8) The volume resistivity of the magnetite particles, the black magnetic composite particles and the black magnetic toner was measured by the following method.

That is, first, 0.5 g of a sample particles or toner to be measured was weighted, and press-molded at 140 $Kg/cm^2$ using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (TYPE2768, manufactured by Yokogawa-Hokushin Denki Co., Ltd.) to measure a resistance value R (Ω).

The cylindrical test piece was measured with respect to an upper surface area A ($cm^2$) and a thickness $t_0$ (cm) thereof. The measured values were inserted into the following formula, thereby obtaining a volume resistivity X (Ω·cm).

$$X(\Omega\cdot cm)=R\times(A/t_0)$$

(9) The average particle size of the black magnetic toner was measured by a laser diffraction-type particle size distribution-measuring apparatus (Model HELOSLA/KA, manufactured by Sympatec Corp.).

(10) The dispersibility in a binder resin of the black magnetic composite particles was evaluated by counting the number of undispersed agglomerated particles on a micrograph (×200 times) obtained by photographing a sectional area of the obtained black magnetic toner particle using an optical microscope (BH-2, manufactured by Olympus Kogaku Kogyo Co., Ltd.), and classifying the results into the following five ranks. The 5th rank represents the most excellent dispersing condition.

Rank 1: not less than 50 undispersed agglomerated particles per 0.25 $mm^2$ were recognized;

Rank 2: 10 to 49 undispersed agglomerated particles per 0.25 $mm^2$ were recognized;

Rank 3: 5 to 9 undispersed agglomerated particles per 0.25 $mm^2$ were recognized;

Rank 4: 1 to 4 undispersed agglomerated particles per 0.25 $mm^2$ were recognized;

Rank 5: No undispersed agglomerated particles were recognized.

(11) The magnetic properties of the magnetite particles and the black magnetic composite particles were measured using a vibration sample magnetometer "VSM-3S-15" (manufactured by Toei Kogyo Co., Ltd.) by applying an external magnetic field of 10 kOe thereto. Whereas, the magnetic properties of the black magnetic toner were measured by applying external magnetic fields of 1 kOe and 10 kOe thereto.

Example 1

<Production of Black Magnetic Composite Particles>

20 kg of spherical magnetite particles shown in the electron micrograph (×30,000) of FIG. 1 (sphericity: 1.2, average particle size: 0.23 μm; geometrical standard deviation value: 1.42; BET specific surface area value: 9.2 $m^2$g; fluidity index: 35, blackness (L* value): 20.6; volume resistivity: $7.1\times10^6$ Ω·cm, a coercive force value: 61 Oe, a saturation magnetization value in a magnetic field of 10 kOe coercive force value: 84.9 emu/g; residual magnetization value in a magnetic field of 10 kOe: 7.8 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the spherical magnetite particles.

Successively, the obtained slurry containing the spherical magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the spherical magnetite particles were dispersed.

The particles in the obtained slurry which remained on a sieve of 325 meshes (mesh size: 44 μm) was 0%. The slurry was filtered and washed with water, thereby obtaining a filter cake containing the spherical magnetite particles. After the obtained filter cake containing the spherical magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 kg/cm for 30 minutes, thereby lightly deagglomerating the particles.

Next, 2,750 g of a colloidal silica solution Snowtex-XS (tradename, produced by Nissan Kagaku Kogyo, Co., Ltd.) containing silicon oxide fine particles having an average particle size of 0.005 μm ($SiO_2$ content: 20% by weight), was added to the deagglomerated spherical magnetite particles under the operation of the edge runner. The spherical magnetite particles were continuously mixed and stirred at a linear load of 60 kg/cm for 60 minutes, thereby adhering the silicon oxide fine particles onto the surface of each spherical magnetite particle. The obtained black particles were subjected to fluorescent X-ray analysis, so that it was confirmed that the amount of the silicon oxide fine particles adhered was 5.0% by weight (calculated as $SiO_2$) based on the weight of the spherical magnetite particles.

Figure 2:
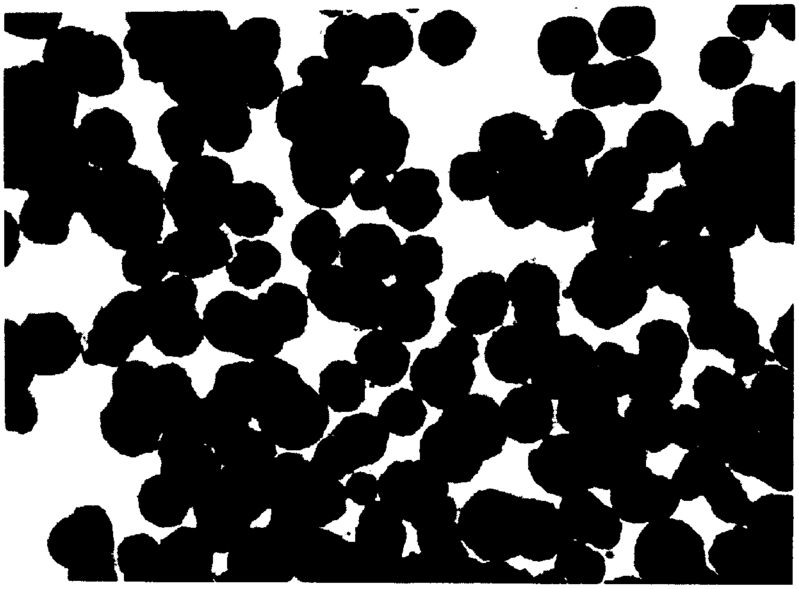
FIG. 2 is an electron micrograph (×30,000) showing a particle structure of spherical magnetite particles obtained in Example 1 on the surfaces of which silicon oxide fine particles are adhered or exist.

In addition, as shown in the electron micrograph (×30,000) of FIG. 2, since no independent silicon oxide fine particles were observed, it was confirmed that a substantially whole amount of the silicon oxide fine particles added were adhered onto the surfaces of the spherical magnetite particles.

Next, 550 g of a methyl hydrogen polysiloxane TSF484 (tradename, produced by Toshiba Silicone Co., Ltd.) was added to the obtained particles for 10 minutes while operating the edge runner. Further, the mixture were continuously mixed and stirred at a linear load of 60 kg/cm for 60 minutes to coat the spherical magnetite particles on the surfaces of which the silicon oxide fine particles were adhered, with methyl hydrogen polysiloxane, thereby obtaining black magnetic composite particles in which the silicon oxide fine particles existed between the surface of each spherical magnetite particle and the methyl hydrogen polysiloxane coating layer.

Figure 3:
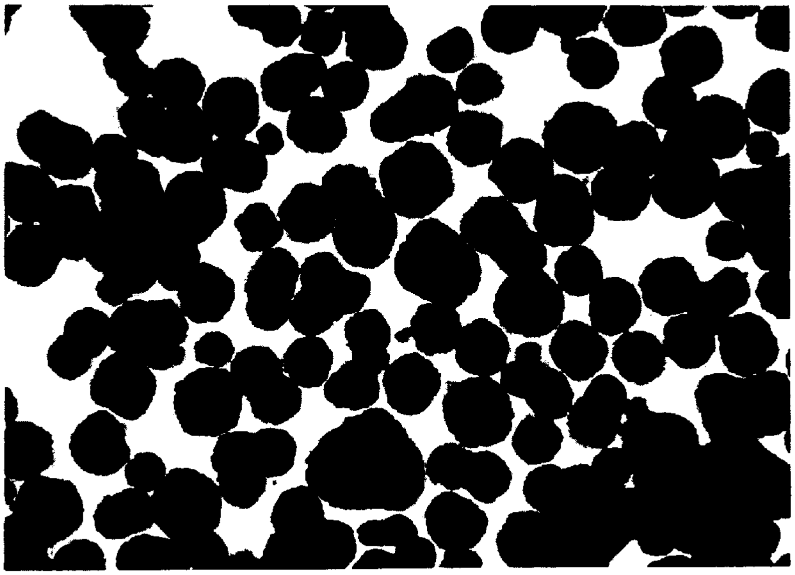
FIG. 3 is an electron micrograph (×30,000) showing a particle structure of black magnetic composite particles obtained in Example 1.

The obtained black magnetic composite particles were dried at 80° C. for 180 minutes by using a drier to evaporate water, etc. which remained on the surfaces thereof. As shown in the electron micrograph (×30,000) of FIG. 3, the resultant black magnetic composite particles had an average particle size of 0.24 μm. In addition, as shown in FIG. 3, since no independent silicon oxide fine particles were observed, it was confirmed that a substantially whole amount of the silicon oxide fine particles added were adhered or existed on the surface of each spherical magnetite particle. The obtained black magnetic composite particles exhibited a sphericity of 1.2:1, a geometrical standard deviation value of 1.42, a BET specific surface area value of 10.6 $m^2$/g, a flowability index of 51, a blackness (L* value) of 20.8 and a volume resistivity of $1.0\times10^{10}$ Ω·cm. As to the magnetic properties of the black magnetic composite particles, the coercive force value thereof was 61 Oe; the saturation magnetization value in a magnetic field of 10 kOe was 77.2 emu/g; and the residual magnetization value in a magnetic field of 10 kOe was 7.1 emu/g. As a result of the fluorescent X-ray analysis, it was confirmed that the amount of methyl hydrogen polysiloxane applied was 4.66% by weight (calculated as $SiO_2$) based on the weight of the spherical magnetite particles on the surfaces of which the silicon oxide fine particles were adhered or existed.

Figure 4:
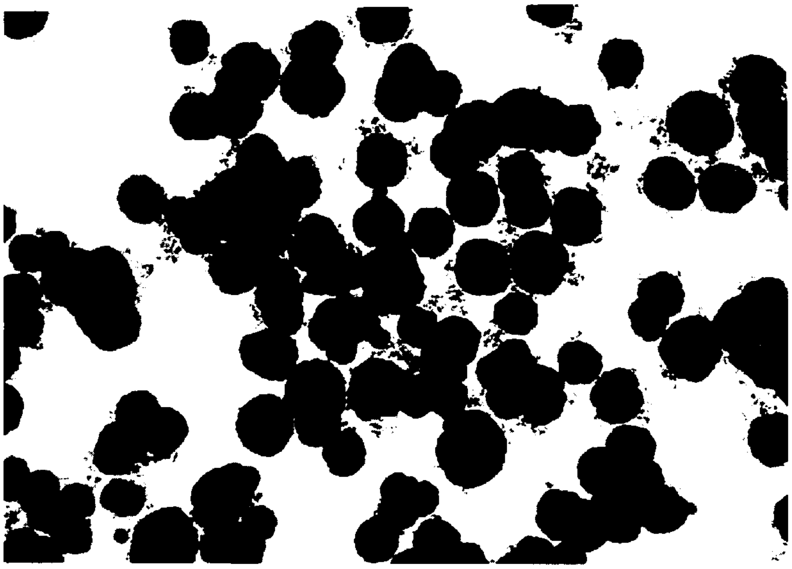
FIG. 4 is an electron micrograph (×30,000) showing a particle structure of mixed particles composed of the spherical magnetite particles and the silicon oxide fine particles.
Figure 5:
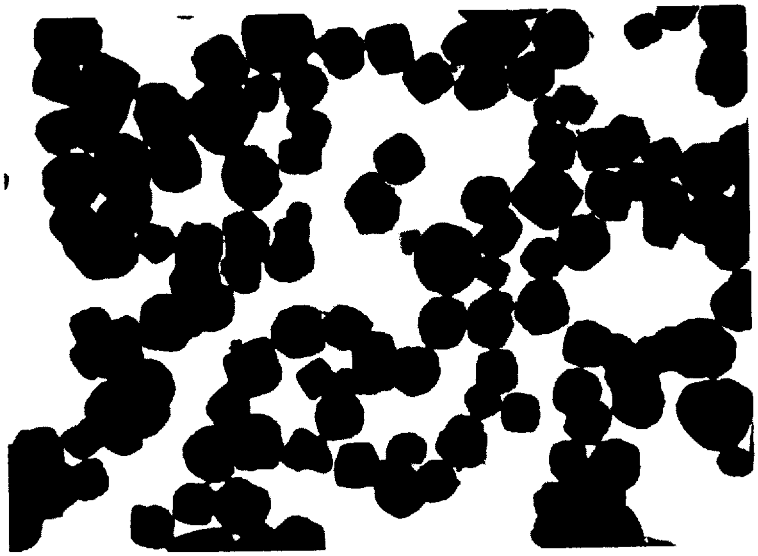
FIG. 5 is an electron micrograph (×30,000) showing a particle structure of black magnetic composite particles obtained in Example 11.
Figure 6:
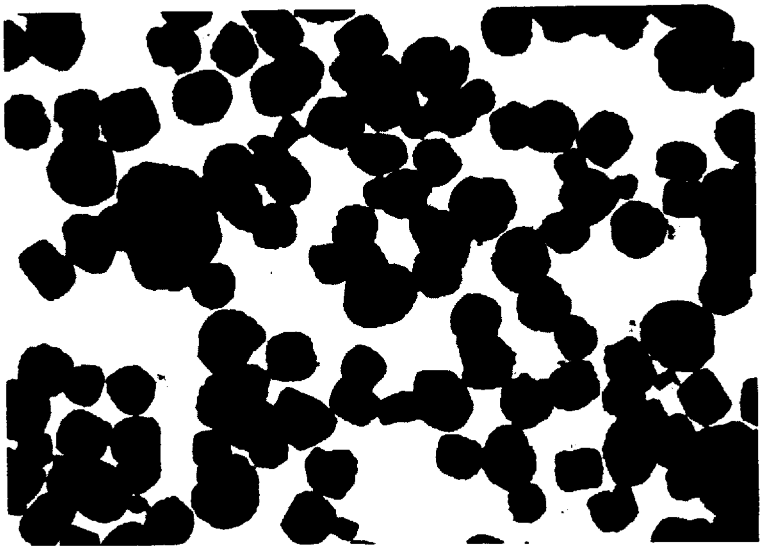
FIG. 6 is an electron micrograph (×30,000) showing a particle structure of black magnetic composite particles obtained in Example 12.
Figure 7:
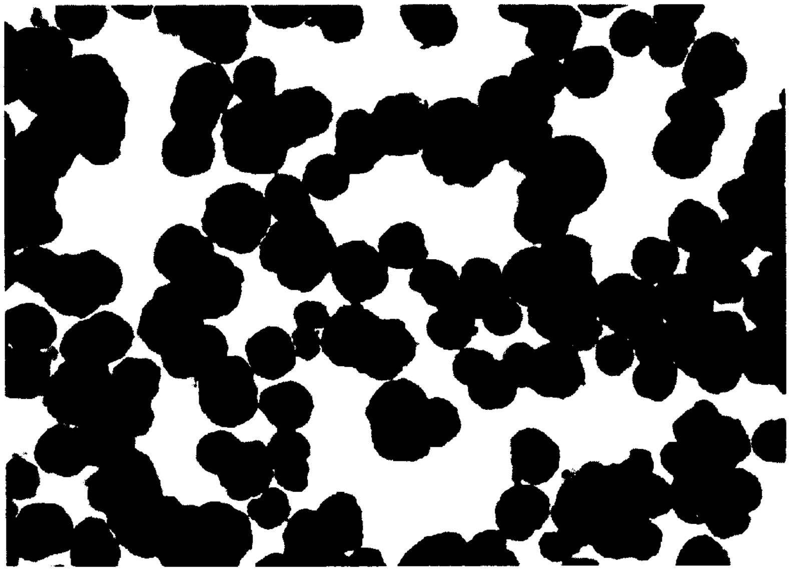
FIG. 7 is an electron micrograph (×30,000) showing a particle structure of black magnetic composite particles obtained in Example 13.
Figure 8:
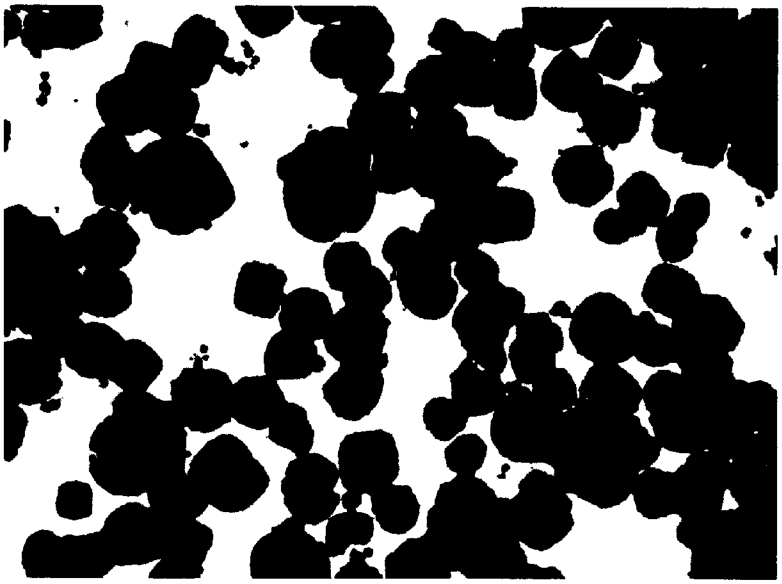
FIG. 8 is an electron micrograph (×30,000) showing a particle structure of black magnetic composite particles obtained in Example 14.

For comparative purpose, the spherical magnetite particles and the colloidal silica solution containing the silicon oxide fine particles were mixed and stirred for 30 minutes using a powder mixer, thereby obtaining black particles. FIG. 4 shows an electron micrograph (×30,000) of the obtained black particles. As shown in FIG. 4, it was confirmed that the silicon oxide fine particles did not exist on the surfaces of the spherical magnetite particles, and the obtained black particles were mixed particles composed of the spherical magnetite particles and the silicon oxide fine particles.

Example 2

<Production of Black Magnetic Toner Containing Black Magnetic Composite Particles>

<Production of Black Magnetic Toner (I)>

400 g of the black magnetic composite particles obtained in Example 1, 540 g of styrene-butyl acrylate-methyl methacrylate copolymer resin (molecular weight=130,000, styrene/butyl acrylate/methyl methacrylate=82.0/16.5/1.5), 60 g of polypropylene wax (molecular weight: 3,000) and 15 g of a charge-controlling agent were charged into a Henschel mixer, and mixed and stirred therein at 60° C. for 15 minutes. The obtained mixed particles were melt-kneaded at 140° C. using a continuous-type twin-screw kneader (T-1), and the obtained kneaded material was cooled, coarsely pulverized and finely pulverized in air. The obtained particles were subjected to classification, thereby producing a black magnetic toner (I).

The obtained black magnetic toner (I) had an average particle size of 9.7 μm, a dispersibility of 5th rank, a fluidity index of 73, a blackness (L* value) of 21.0, a volume resistivity of $1.2\times10^{14}$ Ω·cm, a coercive force value of 60 Oe, a saturation magnetization value (in a magnetic field of 10 kOe) of 31.8 emu/g, a residual magnetization value (in a magnetic field of 10 kOe) of 4.1 emu/g, a saturation magnetization value (in a magnetic field of 1 kOe) of 23.6 emu/g, and a residual magnetization value (in a magnetic field of 1 kOe) of 3.3 emu/g.

<Production of Black Magnetic Toner (II)>

500 g of spherical magnetite particles (sphericity: 1.2:1, average particle size: 0.23 μm, geometrical standard deviation value: 1.42, BET specific surface area value: 9.2 $m^2/g$, flowability index: 35, blackness (L* value): 20.6, volume resistivity: $7.1\times10^{6}$ Ω·cm, coercive force value: 61 Oe; saturation magnetization value in a magnetic field of 10 kOe: 84.9 emu/g; residual magnetization value in a magnetic field of 10 kOe: 7.8 emu/g), 450 g of styrene-butyl acrylate-methyl methacrylate copolymer resin (molecular weight=130,000, styrene/butyl acrylate/methyl methacrylate=82.0/16.5/1.5), 50 g of polypropylene wax (molecular weight: 3,000) and 15 g of a charge-controlling agent were charged into a Henschel mixer, and mixed and stirred therein at 60° C. for 15 minutes, thereby obtaining a mixture. The obtained mixture was melt-kneaded at 140° C. using a continuous-type twin-screw kneader (T-1), and the obtained kneaded material was cooled in air, coarsely pulverized and finely pulverized. Thereafter, the obtained particles were subjected to classification, thereby producing composite particles.

101.5 g of the obtained composite particles and 1.0 g of the black magnetic composite particles obtained in Example 1 were charged into a bench-type mini-pulverizer D150A (manufactured by Taninaka Co., Ltd.), and mixed and dispersed together for one minute to adhere the black magnetic composite particles on the surfaces of the composite particles, thereby producing a black magnetic toner (II).

The obtained black magnetic toner (II) had an average particle size of 10.2 μm, a flowability index of 83, a blackness (L* value) of 22.8 and a volume resistivity of $9.9\times10^{14}$ Ω·cm. As to the magnetic properties of the black magnetic toner (II), the coercive force value thereof was 58 Oe; the saturation magnetization value in a magnetic field of 10 kOe was 39.6 emu/g; the residual magnetization value in a magnetic field of 10 kOe was 6.3 emu/g; the saturation magnetization value in a magnetic field of 1 kOe was 26.8 emu/g; and the residual magnetization value in a magnetic field of 1 kOe was 4.1 emu/g.

<Production of Black Magnetic Toner (III)>

101.5 g of the black magnetic toner (I) and 1.0 g of the black magnetic composite particles obtained in Example 1 were charged into a bench-type mini-pulverizer D150A (manufactured by Taninaka Co., Ltd.), and mixed and dispersed together for one minute to adhere the black magnetic composite particles on the surface of the black magnetic toner (I), thereby producing a black magnetic toner (III).

The obtained black magnetic toner (III) had an average particle size of 10.1 μm, a flowability index of 91, a blackness (L* value) of 21.6 and a volume resistivity of $1.6\times10^{15}$ Ω·cm. As to the magnetic properties of the black magnetic toner (III), the coercive force value thereof was 60 Oe; the saturation magnetization value in a magnetic field of 10 kOe was 41.2 emu/g; the residual magnetization value in a magnetic field of 10 kOe was 6.6 emu/g; the saturation magnetization value in a magnetic field of 1 kOe was 27.8 emu/g; and the residual magnetization value in a magnetic field of 1 kOe was 4.3 emu/g.

Core Particles 1 to 4

Various magnetite particles were prepared by known methods. The same procedure as defined in Example 1 was conducted by using the thus prepared particles, thereby obtaining deagglomerated magnetite particles as core particles.

Various properties of the magnetite particles are shown in Table 1.

Core Particles 5

The same procedure as defined in Example 1 was conducted by using 20 kg of the deagglomerated octahedral magnetite particles (core particles 1) and 150 liters of water, thereby obtaining a slurry containing the octahedral magnetite particles. The pH value of the obtained re-dispersed slurry containing the octahedral magnetite particles was adjusted to 10.5, and then the concentration of the slurry was adjusted to 98 g/liter by adding water thereto. After 150 liters of the slurry was heated to 60° C., 5444 ml of a 1.0 mol/liter sodium alminate solution (equivalent to 1.0% by weight (calculated as Al) based on the weight of the octahedral magnetite particles) was added to the slurry. After allowing the slurry to stand for 30 minutes, the pH value of the slurry was adjusted to 7.5 by adding an aqueous acetic acid solution. Successively, 346 g of water glass #3 (equivalent to 0.5% by weight (calculated as $SiO_2$) based on the weight of the octahedral magnetite particles) was added to the slurry. After the slurry was aged for 30 minutes, the pH value of the slurry was adjusted to 7.5 by adding an aqueous acetic acid solution. After further allowing the slurry to stand for 30 minutes, the slurry was subjected to filtration, washing with water, drying and pulverization, thereby obtaining the octahedral magnetite particles coated with hydroxides of aluminum and oxides of silicon.

As a result of fluorescent X-ray analysis, it was confirmed that the content of hydroxides of aluminum was 0.98% by weight (calculated as Al), and the content of oxides of silicon was 0.49% by weight (calculated as $SiO_2$).

As a result of the observation by an electron microscope, the octahedral magnetite particles whose surfaces were coated with hydroxides of aluminum and oxides of silicon, had an average particle size of 0.29 μm, a geometrical standard deviation of particle size distribution of 1.51, a BET specific surface area of 9.8 $m^2/g$, a flowability index of 41, a blackness (L* value) of 21.4 and a volume resistivity of $1.6\times10^7$ Ω·cm. As to the magnetic properties of the octahedral magnetite particles, the coercive force value thereof was 103 Oe; the saturation magnetization value was 86.3 emu/g; and the residual magnetization value was 12.1 emu/g.

Core Particles 6 to 8

The same procedure as defined in the production of the core particles 5 above, was conducted except that kind of core particles, and kind and amount of additives used in the surface treatment were varied, thereby obtaining surface-treated magnetite particles.

Main production conditions are shown in Table 2, and various properties of the obtained surface-treated magnetite particles are shown in Table 3.

Incidentally, at the column of "Kind of coating material" of "Surface-treating step" in Table 2, "A" represents a hydroxide of aluminum, and "S" represents an oxide of silicon.

Examples 3 to 16 and Comparative Examples 1 to 5

<Production of Black Magnetic Composite Particles>

The same procedure as defined in Example 1 was conducted except that kind of magnetite particles, addition or non-addition of a colloidal solution containing fine particles in the fine particle-adhesion step, kind and amount of the colloidal solution added, treating conditions of edge runner in the fine particle-adhesion step, kind and amount of methyl hydrogen polysiloxane added in the step for coating with methyl hydrogen polysiloxane and treating conditions of edge runner in the coating step, were varied, thereby obtaining black magnetic composite particles. The black magnetic composite particles obtained in Examples 3 to 16 were observed by an electron microscope. As a result, almost no independent fine particles were recognized. Therefore, it was confirmed that a substantially whole amount of the fine particles were adhered on or existed in the surfaces of the magnetite particles.

Electron micrographs of the black magnetic composite particles obtained in Examples 11 to 14 are shown in FIGS. 5 to 8, respectively.

Incidentally, in Comparative Example 5, the magnetite particles were coated with methyl hydrogen polysiloxane, and then silicon oxide fine particles were caused to exist on the surface of the thus coated magnetite particles.

Kinds and various properties of the fine particles are shown in Table 4, main treating conditions of the coating step with methyl hydrogen polysiloxane are shown in Table 5, and various properties of the obtained black magnetic composite particles are shown in Table 6.

Examples 17 to 30 and Comparative Examples 6 to 14

<Production of Black Magnetic Toner>

The same procedure as defined in the production of the black magnetic toner (I) of Example 2, was conducted except that the black magnetic composite particles obtained in Examples 3 to 16, the magnetite particles as core particles 1 to 4 and the black magnetic composite particles obtained in Comparative Examples 1 to 5 were used as magnetic particles to be contained in the composite particles and exposed to the surface of each composite particle, and the mixing percentage of the black magnetic composite particles and the binder resin was varied, thereby obtaining black magnetic toners.

Main production conditions and various properties of the obtained black magnetic toners are shown in Tables 7 to 8.

Examples 31 to 44

<Production of Black Magnetic Toner>

The same procedure as defined in the production of the black magnetic toner (II) of Example 2, was conducted except that the kind of the magnetite particles contained and exposed to the surface of the composite particle, the kind of the black magnetic composite particles to be adhered to the surface of each composite particle, and the mixing percentage of the black magnetic composite particles and the binder resin was varied, were varied, thereby obtaining black magnetic toners.

Main production conditions and various properties of the obtained black magnetic toners are shown in Tables 9 and 10, respectively.

Examples 45 to 58

<Production of Black Magnetic Toner>

The same procedure as defined in the production of the black magnetic toner (III) of Example 2, was conducted except that the kind of the composite particles and the kind of the black magnetic composite particles to be adhered to the surface of each composite particle, were varied, thereby obtaining black magnetic toners.

Main production conditions and various properties of the obtained black magnetic toners are shown in Tables 11 and 12, respectively.

Examples 59 to 62

The same procedure as defined in the production of the black magnetic toner (I) of Example 2, was conducted except that the black magnetic composite particles obtained in Examples 3 to 6 and the magnetite particles as core particles 1 to 4 were used as magnetic particles to be contained in the composite particles and exposed to the surface of each composite particle, and the mixing percentage of the black magnetic composite particles and the binder resin was varied, thereby obtaining black magnetic toners.

Main production conditions and various properties of the obtained black magnetic toners are shown in Tables 13 and 14, respectively.

Examples 63 to 72

The same procedure as defined in the production of the black magnetic toner (III) of Example 2, was conducted except that the black magnetic composite particles obtained in Examples 7 to 16 and the magnetite particles as core particles 1 to 8 were used as magnetic particles to be contained in the composite particles and exposed to the surface of each composite particle, the black magnetic composite particles obtained in Examples 3 to 12 were used as the black magnetic composite particles to be adhered to the surface of each composite particle, and the mixing percentage of the black magnetic composite particles and the binder resin was varied, thereby obtaining black magnetic toners.

Main production conditions and various properties of the obtained black magnetic toners are shown in Tables 13 and 14, respectively.

TABLE 1

| Core particles | Properties of magnetite particles: Kind | Particle shape | Average particle size (major axis diameter) ($\mu$m) |
|---|---|---|---|
| Core particles 1 | Magnetite particles | Octahedral | 0.28 |
| Core particles 2 | Magnetite particles | Spherical | 0.23 |
| Core particles 3 | Magnetite particles | Acicular | 0.40 |
| Core particles 4 | Magnetite particles | Spherical | 0.21 |

| Core particles | Properties of magnetite particles: Aspect ratio (or sphericity) (−) | Geometrical standard deviation (−) | BET specific surface area ($m^2/g$) |
|---|---|---|---|
| Core particles 1 | — | 1.53 | 4.6 |
| Core particles 2 | 1.2:1 | 1.35 | 11.8 |
| Core particles 3 | 8.1:1 | 1.53 | 18.8 |
| Core particles 4 | 1.2:1 | 1.42 | 7.2 |

| Core particles | Properties of magnetite particles: Flowability index (−) | Blackness (L* value) (−) | Volume resistivity (Ω · cm) |
|---|---|---|---|
| Core particles 1 | 34 | 20.3 | $1.3 \times 10^7$ |
| Core particles 2 | 38 | 20.1 | $8.1 \times 10^6$ |
| Core particles 3 | 32 | 23.8 | $9.3 \times 10^6$ |
| Core particles 4 | 36 | 21.0 | $1.1 \times 10^7$ |

| Coercive Core particles | Properties of magnetite particles, Magnetic properties: magnetization force (Oe) | Saturation magnetization (10 kOe) (emu/g) | Residual (10 kOe) (emu/g) |
|---|---|---|---|
| Core particles 1 | 101 | 86.8 | 12.2 |
| Core particles 2 | 63 | 85.1 | 7.7 |
| Core particles 3 | 343 | 86.3 | 29.3 |
| Core particles 4 | 53 | 83.6 | 8.3 |

TABLE 2

| | | Surface-treating process | | | | | |
|---|---|---|---|---|---|---|---|
| | | Additives | | | Coating material | | |
| Core particles | Kind of core particles | Kind | Calculated as | Amount (wt. %) | Kinds | Calculated as | Amount (wt. %) |
| Core particles 5 | Core particles 1 | Aluminum sulfate | Al | 1.0 | A | Al | 0.98 |
| | | Water glass #3 | $SiO_2$ | 0.5 | S | $SiO_2$ | 0.49 |
| Core particles 6 | Core particles 2 | Sodium aluminate | Al | 2.0 | A | Al | 1.92 |
| | | Water glass #3 | $SiO_2$ | 1.0 | S | $SiO_2$ | 0.96 |
| Core particles 7 | Core particles 3 | Aluminum acetate | Al | 5.0 | A | Al | 4.75 |
| Core particles 8 | Core particles 4 | Water glass #3 | $SiO_2$ | 1.0 | S | $SiO_2$ | 0.98 |

TABLE 3

| Core particles | Properties of surface-treated magnetite particles: Average particle size (average major axis diameter) ($\mu$m) | Aspect ratio (or sphericity) (−) | Geometrical standard deviation (−) | BET specific surface area ($m^2/g$) | Flowability index (−) |
|---|---|---|---|---|---|
| Core particles 5 | 0.29 | — | 1.51 | 9.8 | 41 |
| Core particles 6 | 0.24 | 1.2:1 | 1.35 | 14.1 | 42 |
| Core particles 7 | 0.40 | 8.2:1 | 1.52 | 25.4 | 40 |
| Core particles 8 | 0.21 | 1.2:1 | 1.42 | 8.0 | 41 |

| | Properties of surface-treated magnetite particles | | | | |
|---|---|---|---|---|---|
| | | | Magnetic properties | | |
| Core particles | Blackness (L* value) (−) | Volume resistivity (Ω · cm) | Coercive force (Oe) | Saturation magnetization (10kOe) (emu/g) | Residual magnetization (10kOe) (emu/g) |
| Core particles 5 | 21.4 | $1.6 \times 10^7$ | 103 | 86.3 | 12.1 |
| Core particles 6 | 20.8 | $8.6 \times 10^6$ | 61 | 84.6 | 7.6 |
| Core particles 7 | 24.6 | $1.8 \times 10^7$ | 336 | 86.0 | 19.8 |
| Core particles 8 | 21.6 | $2.3 \times 10^7$ | 53 | 83.3 | 8.4 |

TABLE 4

| Fine particles | Kind of fine particles | Properties of fine particles: Particle shape | Average particle size (μm) | Geometrical standard deviation (−) |
|---|---|---|---|---|
| Silicon oxide fine particles A | Snowtex-XS ($SiO_2$ content: 20%, produced by Nissan Kagaku Kogyo Co., Ltd.) | Granular | 0.005 | 1.46 |
| Silicon oxide fine particles B | Snowtex-SS ($SiO_2$ content: 15%, produced by Nissan Kagaku Kogyo Co., Ltd.) | Granular | 0.005 | 1.45 |
| Silicon oxide fine particles C | Snowtex-UP ($SiO_2$ content: 20%, produced by Nissan Kagaku Kogyo Co., Ltd.) | Elongated | 0.015 | 2.56 |
| Hydrated alumina fine particles D | AS-520 ($Al_2O_3$ content: 20%, produced by Nissan Kagaku Kogyo Co., Ltd.) | Granular | 0.015 | 2.14 |

TABLE 4-continued

| Fine particles | Kind of fine particles | Properties of fine particles: Particle shape | Average particle size (μm) | Geometrical standard deviation (−) |
|---|---|---|---|---|
| Titania fine particles E | STS-01 ($TiO_2$ content: 30%, produced by Ishihara Sangyo Co., Ltd.) | Granular | 0.007 | 1.56 |
| Zirconia fine particles F | NZS-30A ($ZrO_2$ content: 30%, produced by Nissan Kagaku Kogyo Co., Ltd.) | Granular | 0.070 | 1.63 |
| Ceria fine particles G | Ceria-sol ($CeO_2$ content: 20%, produced by Nissan Kagaku Kogyo Co., Ltd.) | Granular | 0.010 | 1.46 |

TABLE 5

| | | Production of black magnetic composite particles Addition of colloid solution containing fine particles | | | | | |
|---|---|---|---|---|---|---|---|
| | | Fine particles added | | Edge runner treatment | | Amount of fine particles existing on core particle | |
| Examples and Comparative Examples | Kind of core particles | Kind | Amount (part by weight) | Linear load (Kg/cm) | Time (min) | Calculated as | Amount (wt. %) |
| Example 3 | Core particles 1 | Silicon oxide fine particles A | 25.0 | 60 | 30 | $SiO_2$ | 4.56 |
| Example 4 | Core particles 2 | Silicon oxide fine particles A | 22.0 | 75 | 20 | $SiO_2$ | 4.14 |
| Example 5 | Core particles 3 | Silicon oxide fine particles B | 10.0 | 45 | 60 | $SiO_2$ | 1.92 |
| Example 6 | Core particles 4 | Silicon oxide fine particles C | 5.0 | 60 | 30 | $SiO_2$ | 0.98 |
| Example 7 | Core particles 5 | Silicon oxide fine particles A | 25.0 | 60 | 25 | $SiO_2$ | 4.68 |
| Example 8 | Core particles 6 | Silicon oxide fine particles A | 18.0 | 45 | 45 | $SiO_2$ | 3.36 |
| Example 9 | Core particles 7 | Silicon oxide fine particles B | 23.0 | 60 | 30 | $SiO_2$ | 4.32 |
| Example 10 | Core particles 8 | Silicon oxide fine particles C | 20.0 | 60 | 30 | $SiO_2$ | 3.70 |
| Example 11 | Core particles 1 | Hydrated alumina fine particles D | 25.0 | 60 | 30 | $Al_2O_3$ | 4.64 |
| Example 12 | Core particles 2 | Titania fine particles E | 10.0 | 45 | 60 | $TiO_2$ | 2.92 |
| Example 13 | Core particles 3 | Zirconia fine particles F | 15.0 | 30 | 45 | $ZrO_2$ | 4.41 |
| Example 14 | Core particles 4 | Ceria fine particles G | 10.0 | 60 | 30 | $CeO_2$ | 1.96 |
| Example 15 | Core particles 5 | Silicon oxide fine particles A | 15.0 | 60 | 20 | $SiO_2$ | 2.96 |
| | | | | | | $Al_2O_3$ | 1.89 |
| | | Hydrated alumina fine particles D | 10.0 | | | | |
| Example 16 | Core particles 6 | Silicon oxide fine particles A | 5.0 | 45 | 45 | $SiO_2$ | 0.98 |
| | | | | | | $ZrO_2$ | 1.84 |
| | | Zirconia fine particles F | 10.0 | | | | |
| Comparative Example 1 | Core particles 1 | — | — | — | — | — | — |
| Comparative Example 2 | Core particles 1 | Silicon oxide fine particles A | 10.0 | 60 | 30 | $SiO_2$ | 1.93 |
| Comparative Example 3 | Core particles 1 | Silicon oxide fine particles A | 5.0 | 60 | 30 | $SiO_2$ | 0.97 |

TABLE 5-continued

| | | | | | | | |
|---|---|---|---|---|---|---|---|
| Comparative Example 4 | Core particles 1 | Silicon oxide fine particles A | 0.1 | 60 | 30 | $SiO_2$ | $2.0 \times 10^{-4}$ |
| Comparative Example 5 | Core particles 1 | Silicon oxide fine particles A | 10.0 | 60 | 30 | $SiO_2$ | 1.92 |

| Examples and Comparative Examples | Production of black magnetic composite particles Coating with methyl hydrogen polysiloxane | | | | |
|---|---|---|---|---|---|
| | Methyl hydrogen polysiloxane | | Edge runner treatment | | Coating amount |
| | Kind | Amount added (calculated as $SiO_2$) (part by weight) | Linear load (Kg/cm) | Time (min) | (calculated as $SiO_2$) (wt. %) |
| Example 3 | TSF484 | 5.0 | 60 | 30 | 4.95 |
| Example 4 | TSF484 | 2.0 | 60 | 30 | 1.97 |
| Example 5 | TSF483 | 1.0 | 45 | 60 | 1.01 |
| Example 6 | TSF484 | 10.0 | 60 | 25 | 10.03 |
| Example 7 | TSF484 | 5.0 | 30 | 60 | 4.99 |
| Example 8 | TSF484 | 5.0 | 60 | 30 | 4.91 |
| Example 9 | TSF483 | 10.0 | 50 | 30 | 10.09 |
| Example 10 | TSF484 | 7.5 | 75 | 20 | 7.39 |
| Example 11 | TSF484 | 10.0 | 60 | 30 | 9.13 |
| Example 12 | TSF484 | 7.5 | 45 | 45 | 6.98 |
| Example 13 | TSF484 | 5.0 | 60 | 30 | 4.81 |
| Example 14 | TSF484 | 10.0 | 75 | 20 | 10.00 |
| Example 15 | TSF484 | 10.0 | 60 | 30 | 9.64 |
| Example 16 | TSF484 | 7.5 | 60 | 45 | 7.41 |
| Comparative Example 1 | TSF484 | 10.0 | 60 | 30 | 10.09 |
| Comparative Example 2 | — | — | — | — | — |
| Comparative Example 3 | TSF484 | 0.005 | 60 | 30 | 0.004 |
| Comparative Example 4 | TSF484 | 2.0 | 60 | 30 | 1.91 |
| Comparative Example 5 | TSF484 | 2.0 | 60 | 30 | 1.92 |

TABLE 6

| Examples and Comparative Examples | Properties of black magnetic composite particles | | | |
|---|---|---|---|---|
| | Average particle size (average major axis diameter) ($\mu$m) | Aspect ratio (or sphericity) (–) | Geometrical standard deviation (–) | BET specific surface area ($m^2/g$) |
| Example 3 | 0.29 | — | 1.52 | 10.6 |
| Example 4 | 0.24 | 1.2:1 | 1.35 | 13.8 |
| Example 5 | 0.41 | 8.1:1 | 1.51 | 26.5 |
| Example 6 | 0.22 | 1.2:1 | 1.42 | 14.8 |
| Example 7 | 0.30 | — | 1.51 | 15.2 |
| Example 8 | 0.25 | 1.2:1 | 1.35 | 19.8 |
| Example 9 | 0.41 | 8.1:1 | 1.51 | 31.3 |
| Example 10 | 0.23 | 1.2:1 | 1.42 | 14.6 |
| Example 11 | 0.29 | — | 1.52 | 12.1 |
| Example 12 | 0.24 | 1.2:1 | 1.35 | 15.6 |
| Example 13 | 0.41 | 8.1:1 | 1.51 | 27.2 |
| Example 14 | 0.22 | 1.2:1 | 1.42 | 13.6 |
| Example 15 | 0.30 | — | 1.52 | 15.6 |
| Example 16 | 0.25 | 1.2:1 | 1.36 | 20.5 |
| Comparative Example 1 | 0.29 | — | 1.53 | 3.8 |
| Comparative Example 2 | 0.29 | — | 1.53 | 10.6 |
| Comparative Example 3 | 0.29 | — | 1.53 | 12.6 |
| Comparative Example 4 | 0.29 | — | 1.53 | 13.8 |

TABLE 6-continued

| | | | | |
|---|---|---|---|---|
| Comparative Example 5 | 0.29 | — | 1.53 | 14.1 |

| Examples and Comparative Examples | Properties of black magnetic composite particles | | |
|---|---|---|---|
| | Flowability index (–) | Blackness (L* value) (–) | Volume resistivity ($\Omega \cdot cm$) |
| Example 3 | 56 | 21.5 | $1.1 \times 10^{10}$ |
| Example 4 | 53 | 21.3 | $6.8 \times 10^{9}$ |
| Example 5 | 50 | 25.1 | $5.6 \times 10^{9}$ |
| Example 6 | 56 | 22.0 | $7.3 \times 10^{9}$ |
| Example 7 | 59 | 22.3 | $1.6 \times 10^{10}$ |
| Example 8 | 57 | 22.0 | $2.5 \times 10^{10}$ |
| Example 9 | 61 | 25.3 | $1.0 \times 10^{10}$ |
| Example 10 | 60 | 22.5 | $3.2 \times 10^{10}$ |
| Example 11 | 58 | 21.4 | $7.2 \times 10^{9}$ |
| Example 12 | 59 | 21.4 | $8.8 \times 10^{9}$ |
| Example 13 | 60 | 25.3 | $1.1 \times 10^{10}$ |
| Example 14 | 58 | 21.8 | $8.2 \times 10^{9}$ |
| Example 15 | 63 | 22.1 | $1.6 \times 10^{10}$ |
| Example 16 | 65 | 22.6 | $2.1 \times 10^{10}$ |
| Comparative Example 1 | 43 | 21.8 | $7.9 \times 10^{7}$ |
| Comparative Example 2 | 42 | 21.6 | $2.6 \times 10^{6}$ |
| Comparative Example 3 | 42 | 21.3 | $7.2 \times 10^{6}$ |

TABLE 6-continued

| | | | |
|---|---|---|---|
| Comparative Example 4 | 46 | 21.6 | $8.6 \times 10^7$ |
| Comparative Example 5 | 46 | 21.8 | $9.8 \times 10^7$ |

| Examples and Comparative Examples | Properties of black magnetic composite particles Magnetic properties Coercive force (Oe) | Saturation magnetization (10 kOe) (emu/g) | Residual magnetization (10 kOe) (emu/g) |
|---|---|---|---|
| Example 3 | 108 | 79.3 | 11.3 |
| Example 4 | 62 | 80.2 | 6.8 |
| Example 5 | 333 | 83.8 | 28.6 |
| Example 6 | 53 | 80.0 | 6.6 |
| Example 7 | 102 | 78.7 | 11.6 |
| Example 8 | 63 | 78.1 | 6.9 |
| Example 9 | 330 | 75.2 | 26.3 |
| Example 10 | 53 | 78.8 | 6.8 |
| Example 11 | 107 | 77.2 | 11.0 |
| Example 12 | 61 | 78.3 | 6.5 |
| Example 13 | 335 | 80.6 | 28.4 |
| Example 14 | 51 | 79.9 | 6.6 |
| Example 15 | 101 | 77.6 | 11.2 |
| Example 16 | 63 | 77.1 | 6.5 |
| Comparative Example 1 | 101 | 79.0 | 10.3 |
| Comparative Example 2 | 101 | 85.2 | 11.0 |
| Comparative Example 3 | 102 | 86.0 | 11.5 |
| Comparative Example 4 | 103 | 85.2 | 11.6 |
| Comparative Example 5 | 101 | 83.6 | 11.3 |

TABLE 7

| | Production of black magnetic toner | | | |
|---|---|---|---|---|
| | Black magnetic composite particles | | Resin | |
| Examples | Kind | Amount blended (part by weight) | Kind | Amount blended (part by weight) |
| Example 17 | Example 3 | 50 | Styrene-acryl copolymer resin | 50 |
| Example 18 | Example 4 | 50 | Styrene-acryl copolymer resin | 50 |
| Example 19 | Example 5 | 50 | Styrene-acryl copolymer resin | 50 |
| Example 20 | Example 6 | 50 | Styrene-acryl copolymer resin | 50 |
| Example 21 | Example 7 | 50 | Styrene-acryl copolymer resin | 50 |
| Example 22 | Example 8 | 50 | Styrene-acryl copolymer resin | 50 |
| Example 23 | Example 9 | 50 | Styrene-acryl copolymer resin | 50 |
| Example 24 | Example 10 | 50 | Styrene-acryl copolymer resin | 50 |
| Example 25 | Example 11 | 50 | Styrene-acryl copolymer resin | 50 |
| Example 26 | Example 12 | 50 | Styrene-acryl copolymer resin | 50 |
| Example 27 | Example 13 | 50 | Styrene-acryl copolymer resin | 50 |
| Example 28 | Example 14 | 50 | Styrene-acryl copolymer resin | 50 |

TABLE 7-continued

| | | | | |
|---|---|---|---|---|
| Example 29 | Example 15 | 50 | Styrene-acryl copolymer resin | 50 |
| Example 30 | Example 16 | 50 | Styrene-acryl copolymer resin | 50 |

| | Properties of black magnetic toner | | | |
|---|---|---|---|---|
| Examples | Average particle size ($\mu$m) | Dispers-ibility (–) | Flow-ability index (–) | Volume resistivity ($\Omega \cdot$ cm) |
| Example 17 | 9.6 | 5 | 75 | $5.8 \times 10^{14}$ |
| Example 18 | 10.0 | 5 | 81 | $1.6 \times 10^{15}$ |
| Example 19 | 10.6 | 4 | 75 | $7.0 \times 10^{14}$ |
| Example 20 | 9.8 | 5 | 79 | $6.6 \times 10^{14}$ |
| Example 21 | 9.5 | 5 | 80 | $6.8 \times 10^{14}$ |
| Example 22 | 10.0 | 5 | 86 | $1.5 \times 10^{15}$ |
| Example 23 | 9.3 | 5 | 78 | $1.7 \times 10^{15}$ |
| Example 24 | 9.8 | 5 | 83 | $1.3 \times 10^{15}$ |
| Example 25 | 10.1 | 5 | 78 | $8.1 \times 10^{14}$ |
| Example 26 | 10.0 | 4 | 83 | $6.3 \times 10^{14}$ |
| Example 27 | 9.9 | 5 | 78 | $5.9 \times 10^{14}$ |
| Example 28 | 9.9 | 5 | 81 | $7.8 \times 10^{14}$ |
| Example 29 | 10.3 | 5 | 86 | $1.8 \times 10^{15}$ |
| Example 30 | 10.2 | 5 | 86 | $1.9 \times 10^{15}$ |

| | Properties of black magnetic toner Magnetic properties | | |
|---|---|---|---|
| | Coercive | Saturation magnetization | |
| Examples | force (Oe) | (10 kOe) (emu/g) | (1 kOe) (emu/g) |
| Example 17 | 104 | 39.7 | 27.8 |
| Example 18 | 61 | 40.3 | 27.1 |
| Example 19 | 325 | 42.0 | 26.8 |
| Example 20 | 54 | 39.3 | 25.8 |
| Example 21 | 99 | 39.5 | 24.1 |
| Example 22 | 62 | 40.0 | 28.4 |
| Example 23 | 322 | 37.6 | 29.5 |
| Example 24 | 54 | 38.1 | 22.8 |
| Example 25 | 104 | 38.6 | 27.4 |
| Example 26 | 60 | 39.2 | 26.8 |
| Example 27 | 324 | 41.0 | 26.4 |
| Example 28 | 54 | 39.3 | 25.7 |
| Example 29 | 100 | 38.9 | 24.2 |
| Example 30 | 62 | 39.6 | 28.2 |

| | Properties of black magnetic toner | | |
|---|---|---|---|
| | Magnetic properties Residual magnetization | | Blackness |
| Examples | (10 kOe) (emu/g) | (1 kOe) (emu/g) | (L* value) (–) |
| Example 17 | 6.4 | 4.3 | 22.9 |
| Example 18 | 5.1 | 3.0 | 23.6 |
| Example 19 | 14.4 | 9.3 | 26.3 |
| Example 20 | 5.0 | 3.1 | 23.8 |
| Example 21 | 5.8 | 4.0 | 24.9 |
| Example 22 | 4.7 | 3.8 | 23.3 |
| Example 23 | 13.6 | 9.8 | 27.8 |
| Example 24 | 5.0 | 3.2 | 24.1 |
| Example 25 | 6.2 | 4.1 | 22.9 |
| Example 26 | 5.0 | 2.8 | 23.8 |
| Example 27 | 14.0 | 9.0 | 26.5 |
| Example 28 | 5.1 | 3.1 | 23.8 |
| Example 29 | 5.6 | 3.9 | 24.3 |
| Example 30 | 4.6 | 3.7 | 23.5 |

TABLE 8

| Comparative Examples | Production of black magnetic toner: Magnetic particles: Kind | Magnetic particles: Amount blended (part by weight) | Resin: Kind | Resin: Amount blended (part by weight) |
|---|---|---|---|---|
| Comparative Example 6 | Core particles 1 | 50 | Styrene-acryl copolymer resin | 50 |
| Comparative Example 7 | Core particles 2 | 50 | Styrene-acryl copolymer resin | 50 |
| Comparative Example 8 | Core particles 3 | 50 | Styrene-acryl copolymer resin | 50 |
| Comparative Example 9 | Core particles 4 | 50 | Styrene-acryl copolymer resin | 50 |
| Comparative Example 10 | Comparative Example 1 | 50 | Styrene-acryl copolymer resin | 50 |
| Comparative Example 11 | Comparative Example 2 | 50 | Styrene-acryl copolymer resin | 50 |
| Comparative Example 12 | Comparative Example 3 | 50 | Styrene-acryl copolymer resin | 50 |
| Comparative Example 13 | Comparative Example 4 | 50 | Styrene-acryl copolymer resin | 50 |
| Comparative Example 14 | Comparative Example 5 | 50 | Styrene-acryl copolymer resin | 50 |

| Comparative Examples | Properties of black magnetic toner: Average particle size ($\mu$m) | Dispersibility (−) | Flowability index (−) | Volume resistivity ($\Omega \cdot$ cm) |
|---|---|---|---|---|
| Comparative Example 6 | 9.7 | 2 | 60 | $9.1 \times 10^{11}$ |
| Comparative Example 7 | 9.9 | 3 | 62 | $7.8 \times 10^{11}$ |
| Comparative Example 8 | 9.7 | 2 | 57 | $4.6 \times 10^{11}$ |
| Comparative Example 9 | 10.0 | 3 | 61 | $7.2 \times 10^{11}$ |
| Comparative Example 10 | 9.6 | 2 | 59 | $4.1 \times 10^{11}$ |
| Comparative Example 11 | 9.9 | 3 | 58 | $7.6 \times 10^{11}$ |
| Comparative Example 12 | 10.1 | 2 | 59 | $9.8 \times 10^{11}$ |
| Comparative Example 13 | 9.8 | 3 | 56 | $6.3 \times 10^{11}$ |
| Comparative Example 14 | 10.2 | 2 | 58 | $3.8 \times 10^{11}$ |

TABLE 8-continued

| Comparative Examples | Properties of black magnetic toner, Magnetic properties: Coercive force (Oe) | Saturation magnetization (10 kOe) (emu/g) | Saturation magnetization (1 kOe) (emu/g) |
|---|---|---|---|
| Comparative Example 6 | 100 | 43.4 | 31.2 |
| Comparative Example 7 | 59 | 42.3 | 30.0 |
| Comparative Example 8 | 331 | 43.2 | 29.0 |
| Comparative Example 9 | 53 | 42.1 | 29.5 |
| Comparative Example 10 | 100 | 43.3 | 31.2 |
| Comparative Example 11 | 99 | 43.2 | 31.1 |
| Comparative Example 12 | 101 | 43.4 | 31.2 |
| Comparative Example 13 | 101 | 43.3 | 31.1 |
| Comparative Example 14 | 101 | 43.4 | 31.2 |

| Comparative Examples | Properties of black magnetic toner, Magnetic properties, Residual magnetization: (10 kOe) (emu/g) | Residual magnetization: (1 kOe) (emu/g) | Blackness (L* value) (−) |
|---|---|---|---|
| Comparative Example 6 | 6.1 | 4.3 | 23.8 |
| Comparative Example 7 | 3.7 | 2.6 | 24.0 |
| Comparative Example 8 | 13.3 | 9.7 | 27.3 |
| Comparative Example 9 | 3.6 | 3.1 | 24.8 |
| Comparative Example 10 | 5.2 | 3.9 | 24.6 |
| Comparative Example 11 | 5.4 | 4.2 | 24.4 |
| Comparative Example 12 | 5.4 | 4.1 | 23.5 |
| Comparative Example 13 | 5.5 | 4.0 | 23.8 |
| Comparative Example 14 | 5.4 | 4.1 | 24.0 |

TABLE 9

| Examples | Production of black magnetic toner, Composite particles: Magnetite particles contained and exposed to surfaces of composite particles: Kind | Amount blended (part by weight) | Binder resin: Kind | Binder resin: Amount blended (part by weight) |
|---|---|---|---|---|
| Example 31 | Core particles 1 | 50 | Styrene-acryl copolymer resin | 50 |
| Example 32 | Core particles 2 | 50 | Styrene-acryl copolymer resin | 50 |
| Example 33 | Core particles 3 | 50 | Styrene-acryl copolymer resin | 50 |

TABLE 9-continued

| | | | | |
|---|---|---|---|---|
| Example 34 | Core particles 4 | 50 | Styrene-acryl copolymer resin | 50 |
| Example 35 | Core particles 5 | 50 | Styrene-acryl copolymer resin | 50 |
| Example 36 | Core particles 6 | 50 | Styrene-acryl copolymer resin | 50 |
| Example 37 | Core particles 7 | 50 | Styrene-acryl copolymer resin | 50 |
| Example 38 | Core particles 8 | 50 | Styrene-acryl copolymer resin | 50 |
| Example 39 | Core particles 1 | 50 | Styrene-acryl copolymer resin | 50 |
| Example 40 | Core particles 2 | 50 | Styrene-acryl copolymer resin | 50 |
| Example 41 | Core particles 3 | 50 | Styrene-acryl copolymer resin | 50 |
| Example 42 | Core particles 4 | 50 | Styrene-acryl copolymer resin | 50 |
| Example 43 | Core particles 5 | 50 | Styrene-acryl copolymer resin | 50 |
| Example 44 | Core particles 6 | 50 | Styrene-acryl copolymer resin | 50 |

| | Production of black magnetic toner Black magnetic composite particles adhered | |
|---|---|---|
| Examples | Kind | Amount blended (part by weight) |
| Example 31 | Example 3 | 2.0 |
| Example 32 | Example 4 | 1.0 |
| Example 33 | Example 5 | 3.0 |
| Example 34 | Example 6 | 0.5 |
| Example 35 | Example 7 | 5.0 |
| Example 36 | Example 8 | 1.0 |
| Example 37 | Example 9 | 1.5 |
| Example 38 | Example 10 | 1.0 |
| Example 39 | Example 11 | 2.0 |
| Example 40 | Example 12 | 1.0 |
| Example 41 | Example 13 | 2.0 |
| Example 42 | Example 14 | 1.0 |
| Example 43 | Example 15 | 3.0 |
| Example 44 | Example 16 | 2.5 |

TABLE 10

| | Properties of black magnetic toner | | |
|---|---|---|---|
| Examples | Average particle size (μm) | Flowability index (–) | Volume resistivity (Ω · cm) |
| Example 31 | 9.9 | 78 | $2.6 \times 10^{14}$ |
| Example 32 | 10.1 | 78 | $3.8 \times 10^{14}$ |
| Example 33 | 10.3 | 79 | $1.4 \times 10^{14}$ |
| Example 34 | 10.0 | 76 | $3.2 \times 10^{14}$ |
| Example 35 | 9.8 | 78 | $1.6 \times 10^{14}$ |
| Example 36 | 10.8 | 79 | $2.1 \times 10^{14}$ |
| Example 37 | 9.6 | 76 | $1.1 \times 10^{14}$ |
| Example 38 | 9.9 | 80 | $1.1 \times 10^{14}$ |
| Example 39 | 10.1 | 77 | $1.8 \times 10^{14}$ |
| Example 40 | 9.8 | 77 | $2.6 \times 10^{14}$ |
| Example 41 | 10.2 | 78 | $1.6 \times 10^{14}$ |
| Example 42 | 9.6 | 78 | $3.8 \times 10^{14}$ |
| Example 43 | 10.3 | 81 | $3.9 \times 10^{14}$ |
| Example 44 | 10.0 | 81 | $4.9 \times 10^{14}$ |

TABLE 10-continued

| | Properties of black magnetic toner Magnetic properties | | |
|---|---|---|---|
| | Coercive | Saturation magnetization | |
| Examples | force (Oe) | (10 kOe) (emu/g) | (1 kOe) (emu/g) |
| Example 31 | 102 | 39.5 | 27.6 |
| Example 32 | 60 | 39.9 | 27.0 |
| Example 33 | 322 | 41.6 | 26.4 |
| Example 34 | 51 | 39.6 | 25.3 |
| Example 35 | 100 | 39.2 | 24.0 |
| Example 36 | 63 | 39.3 | 24.2 |
| Example 37 | 321 | 37.2 | 29.3 |
| Example 38 | 53 | 37.9 | 22.1 |
| Example 39 | 102 | 39.3 | 27.4 |
| Example 40 | 61 | 39.6 | 26.7 |
| Example 41 | 323 | 41.2 | 26.0 |
| Example 42 | 52 | 39.6 | 25.3 |
| Example 43 | 101 | 38.9 | 23.8 |
| Example 44 | 63 | 39.0 | 24.1 |

| | Properties of black magnetic toner | | |
|---|---|---|---|
| | Magnetic properties Residual magnetization | | Blackness |
| Examples | (10 kOe) (emu/g) | (1 kOe) (emu/g) | (L* value) (–) |
| Example 31 | 6.3 | 4.3 | 22.6 |
| Example 32 | 5.0 | 2.9 | 23.4 |
| Example 33 | 14.3 | 9.2 | 25.9 |
| Example 34 | 4.9 | 3.2 | 23.6 |
| Example 35 | 5.9 | 4.1 | 23.8 |
| Example 36 | 4.8 | 3.7 | 23.0 |
| Example 37 | 13.4 | 9.7 | 26.9 |
| Example 38 | 5.1 | 3.2 | 24.3 |
| Example 39 | 6.1 | 4.2 | 22.8 |
| Example 40 | 5.0 | 2.8 | 23.5 |
| Example 41 | 14.1 | 9.1 | 25.8 |
| Example 42 | 4.9 | 3.2 | 23.6 |
| Example 43 | 5.7 | 4.0 | 23.9 |
| Example 44 | 4.7 | 3.6 | 22.9 |

TABLE 11

| | Production of black magnetic toner | | |
|---|---|---|---|
| | | Black magnetic composite particles adhered | |
| Examples | Composite particles Kind | Kind | Amount blended (part by weight) |
| Example 45 | Example 17 | Example 3 | 1.0 |
| Example 46 | Example 18 | Example 4 | 0.5 |
| Example 47 | Example 19 | Example 5 | 0.2 |
| Example 48 | Example 20 | Example 6 | 2.0 |
| Example 49 | Example 21 | Example 7 | 1.5 |
| Example 50 | Example 22 | Example 8 | 1.0 |
| Example 51 | Example 23 | Example 9 | 2.0 |
| Example 52 | Example 24 | Example 10 | 1.0 |
| Example 53 | Example 25 | Example 11 | 2.0 |
| Example 54 | Example 26 | Example 12 | 1.0 |
| Example 55 | Example 27 | Example 13 | 2.0 |
| Example 56 | Example 28 | Example 14 | 1.5 |
| Example 57 | Example 29 | Example 15 | 3.0 |
| Example 58 | Example 30 | Example 16 | 0.8 |

TABLE 12

| Examples | Properties of black magnetic toner: Average particle size (μm) | Flowability index (–) | Volume resistivity (Ω · cm) |
|---|---|---|---|
| Example 45 | 10.0 | 85 | $4.1 \times 10^{15}$ |
| Example 46 | 10.6 | 86 | $2.1 \times 10^{15}$ |
| Example 47 | 10.8 | 88 | $9.0 \times 10^{14}$ |
| Example 48 | 10.2 | 89 | $1.3 \times 10^{15}$ |
| Example 49 | 10.0 | 86 | $7.1 \times 10^{15}$ |
| Example 50 | 10.5 | 90 | $2.4 \times 10^{15}$ |
| Example 51 | 9.7 | 86 | $2.6 \times 10^{15}$ |
| Example 52 | 10.1 | 88 | $1.6 \times 10^{15}$ |
| Example 53 | 10.6 | 89 | $9.8 \times 10^{14}$ |
| Example 54 | 10.4 | 86 | $9.1 \times 10^{14}$ |
| Example 55 | 10.3 | 87 | $2.6 \times 10^{15}$ |
| Example 56 | 10.2 | 86 | $3.1 \times 10^{15}$ |
| Example 57 | 10.8 | 89 | $9.6 \times 10^{15}$ |
| Example 58 | 10.4 | 90 | $8.3 \times 10^{15}$ |

| Examples | Properties of black magnetic toner, Magnetic properties: Coercive force (Oe) | Saturation magnetization (10 kOe) (emu/g) | Saturation magnetization (1 kOe) (emu/g) |
|---|---|---|---|
| Example 45 | 103 | 40.1 | 28.0 |
| Example 46 | 60 | 40.5 | 27.2 |
| Example 47 | 325 | 42.3 | 26.8 |
| Example 48 | 55 | 39.2 | 25.6 |
| Example 49 | 100 | 39.6 | 24.2 |
| Example 50 | 62 | 40.2 | 24.2 |
| Example 51 | 325 | 37.9 | 29.6 |
| Example 52 | 55 | 38.3 | 22.9 |
| Example 53 | 102 | 39.8 | 27.6 |
| Example 54 | 61 | 40.0 | 26.9 |
| Example 55 | 323 | 41.8 | 26.6 |
| Example 56 | 56 | 39.2 | 25.5 |
| Example 57 | 101 | 39.4 | 24.1 |
| Example 58 | 61 | 39.8 | 23.9 |

| Examples | Properties of black magnetic toner, Magnetic properties, Residual magnetization: (10 kOe) (emu/g) | Residual magnetization (1 kOe) (emu/g) | Blackness (L* value) (–) |
|---|---|---|---|
| Example 45 | 6.5 | 4.3 | 22.6 |
| Example 46 | 5.2 | 3.1 | 22.9 |
| Example 47 | 14.5 | 9.3 | 25.9 |
| Example 48 | 5.1 | 3.3 | 23.4 |
| Example 49 | 5.9 | 4.1 | 24.3 |
| Example 50 | 4.8 | 3.9 | 22.9 |
| Example 51 | 13.5 | 9.9 | 27.6 |
| Example 52 | 5.1 | 3.3 | 23.8 |
| Example 53 | 6.4 | 4.2 | 22.7 |
| Example 54 | 5.1 | 3.0 | 23.1 |
| Example 55 | 14.3 | 9.1 | 25.9 |
| Example 56 | 5.1 | 3.3 | 23.4 |
| Example 57 | 5.7 | 4.1 | 24.1 |
| Example 58 | 4.7 | 3.8 | 22.6 |

TABLE 13

| Examples | Production of black magnetic toner, Composite particles, Magnetite particles contained and exposed to surfaces of composite particles: Kind of magnetite particles and black magnetic composite particles | Amount blended (part by weight) | Binder resin: Kind | Binder resin: Amount blended (part by weight) |
|---|---|---|---|---|
| Example 59 | Core particles 1<br>Example 3 | 10<br>40 | Styrene-acryl copolymer resin | 50 |
| Example 60 | Core particles 2<br>Example 4 | 25<br>25 | Styrene-acryl copolymer resin | 50 |
| Example 60 | Core particles 2<br>Example 5 | 25<br>20 | Styrene-acryl copolymer resin | 50 |
| Example 62 | Core particles 4<br>Example 6 | 5<br>45 | Styrene-acryl copolymer resin | 50 |
| Example 63 | Core particles 5<br>Example 7 | 20<br>30 | Styrene-acryl copolymer resin | 50 |
| Example 64 | Core particles 6<br>Example 8 | 40<br>10 | Styrene-acryl copolymer resin | 50 |
| Example 65 | Core particles 7<br>Example 9 | 15<br>35 | Styrene-acryl copolymer resin | 50 |
| Example 66 | Core particles 8<br>Example 10 | 35<br>15 | Styrene-acryl copolymer resin | 50 |
| Example 67 | Core particles 1<br>Example 11 | 30<br>20 | Styrene-acryl copolymer resin | 50 |
| Example 68 | Core particles 2<br>Example 12 | 5<br>45 | Styrene-acryl copolymer resin | 50 |
| Example 69 | Core particles 3<br>Example 13 | 20<br>30 | Styrene-acryl copolymer resin | 50 |
| Example 70 | Core particles 4<br>Example 14 | 40<br>10 | Styrene-acryl copolymer resin | 50 |
| Example 71 | Core particles 5<br>Example 15 | 15<br>35 | Styrene-acryl copolymer resin | 50 |
| Example 72 | Core particles 6<br>Example 16 | 35<br>15 | Styrene-acryl copolymer resin | 50 |

| Examples | Production of black magnetic toner, Black magnetic composite particles adhered: Kind | Amount blended (part by weight) |
|---|---|---|
| Example 59 | — | — |
| Example 60 | — | — |
| Example 61 | — | — |
| Example 62 | — | — |
| Example 63 | Example 3 | 1.0 |
| Example 64 | Example 4 | 0.5 |
| Example 65 | Example 5 | 2.0 |
| Example 66 | Example 6 | 1.0 |
| Example 67 | Example 7 | 1.0 |
| Example 68 | Example 8 | 2.0 |
| Example 69 | Example 9 | 1.0 |
| Example 70 | Example 10 | 2.5 |
| Example 71 | Example 11 | 1.0 |
| Example 72 | Example 12 | 3.0 |

TABLE 14

| Examples | Properties of black magnetic toner Average particle size (μm) | Flowability index (–) | Volume resistivity (Ω · cm) |
|---|---|---|---|
| Example 59 | 10.1 | 79 | $5.6 \times 10^{14}$ |
| Example 60 | 10.4 | 76 | $1.0 \times 10^{15}$ |
| Example 61 | 10.3 | 78 | $8.1 \times 10^{14}$ |
| Example 62 | 10.2 | 79 | $9.6 \times 10^{14}$ |
| Example 63 | 10.4 | 84 | $9.2 \times 10^{14}$ |
| Example 64 | 10.1 | 84 | $2.1 \times 10^{15}$ |
| Example 65 | 9.9 | 83 | $1.0 \times 10^{15}$ |
| Example 66 | 9.6 | 84 | $1.1 \times 10^{15}$ |
| Example 67 | 10.1 | 82 | $2.1 \times 10^{15}$ |
| Example 68 | 10.2 | 84 | $1.6 \times 10^{15}$ |
| Example 69 | 9.8 | 80 | $9.8 \times 10^{14}$ |
| Example 70 | 10.3 | 81 | $2.1 \times 10^{15}$ |
| Example 71 | 9.6 | 83 | $2.5 \times 10^{15}$ |
| Example 72 | 10.5 | 81 | $2.9 \times 10^{15}$ |

| Examples | Properties of black magnetic toner Magnetic properties Coercive force (Oe) | Saturation magnetization (10 kOe) (emu/g) | Saturation magnetization (1 kOe) (emu/g) |
|---|---|---|---|
| Example 59 | 105 | 39.8 | 27.7 |
| Example 60 | 59 | 40.4 | 27.2 |
| Example 61 | 323 | 41.6 | 26.7 |
| Example 62 | 55 | 39.1 | 25.7 |
| Example 63 | 101 | 39.8 | 24.2 |
| Example 64 | 63 | 40.1 | 28.6 |
| Example 65 | 325 | 37.8 | 29.6 |
| Example 66 | 55 | 38.3 | 23.0 |
| Example 67 | 106 | 39.7 | 27.4 |
| Example 68 | 60 | 40.2 | 27.0 |
| Example 69 | 324 | 41.3 | 26.5 |
| Example 70 | 56 | 39.1 | 25.8 |
| Example 71 | 101 | 39.7 | 24.0 |
| Example 72 | 63 | 40.1 | 28.2 |

| Examples | Properties of black magnetic toner Magnetic properties Residual magnetization (10 kOe) (emu/g) | Residual magnetization (1 kOe) (emu/g) | Blackness (L* value) (–) |
|---|---|---|---|
| Example 59 | 6.3 | 4.4 | 22.6 |
| Example 60 | 5.0 | 2.9 | 23.3 |
| Example 61 | 14.3 | 9.2 | 26.0 |
| Example 62 | 4.9 | 3.0 | 23.6 |
| Example 63 | 5.9 | 4.3 | 24.6 |
| Example 64 | 4.8 | 3.9 | 23.1 |
| Example 65 | 13.7 | 9.9 | 27.2 |
| Example 66 | 5.1 | 3.3 | 23.9 |
| Example 67 | 6.1 | 4.3 | 22.5 |
| Example 68 | 4.9 | 2.8 | 23.2 |
| Example 69 | 14.2 | 9.1 | 25.6 |
| Example 70 | 4.8 | 2.9 | 23.8 |
| Example 71 | 5.6 | 4.2 | 24.3 |
| Example 72 | 4.6 | 3.8 | 23.0 |

What is claimed is:

1. Black magnetic composite particles for black magnetic toner, comprising:

magnetite particle as core particle;

fine particles which are adhered or exist on at least a part of the surface of each magnetite particle, and comprise oxides, oxide hydroxides or oxide and oxide hydroxides composed of at least one element selected from the group consisting of Si, Zr, Ti, Al and Ce; and a methyl hydrogen polysiloxane coating layer formed on the surface of the magnetite particles in which the fine particles are adhered or exist on at least a part of the surface of each core particle, in an amount of 0.1 to 50% by weight, calculated as $SiO_2$, based on the weight of the magnetite particles on the surfaces of which said fine particles exist, the average particle size of said black magnetic composite particles being 0.08 to 1.0 μm.

2. Black magnetic composite particles according to claim 1, wherein at least a part of the surface of said magnetite particle as core particle is coated with at least one compound selected from the group consisting of hydroxides of aluminum, oxides of aluminum, hydroxides of silicon and oxides of silicon.

3. Black magnetic composite particles according to claim 2, wherein the coating amount of said at least one compound selected from the group consisting of hydroxides of aluminum, oxides of aluminum, hydroxides of silicon and oxides of silicon, is 0.01 to 50% by weight, calculated as Al or $SiO_2$, based on the weight of said core particles.

4. Black magnetic composite particles according to claim 1, wherein the amount ot said fine particles adhered or existing on the surface of each magnetite particle is 0.5 to 50% by weight, calculated as $SiO_2$, $ZrO_2$, $TiO_2$, $Al_2O_3$ or $CeO_2$, based on the weight of the magnetite particles.

5. Black magnetic composite particles according to claim 1, which further have a geometrical standard deviation of particle size of 1.01 to 2.0, a BET specific surface area of 0.5 to 100 $m^2/g$, and a flowability index of 47 to 70.

6. Black magnetic composite particles according to claim 1, which further have a blackness (L* value) of 16.0 to 27.0 and a volume resistivity of not less than $1.0 \times 10^8$ Ω·cm.

7. Black magnetic composite particles according to claim 1, wherein said magnetite particles had an average particle size of 0.055 to 0.95 μm, a geometrical standard deviation of particle size of 1.01 to 2.0, a BET specific surface area of 0.5 to 70 $m^2/g$, and a flowability index of 25 to 43.

8. Black magnetic composite particles according to claim 1, wherein the particle size of said fine particles is 0.001 to 0.05 μm.

9. Black magnetic composite particles according to claim 1, wherein said methyl hydrogen polysiloxane is represented by the following general formula (1):

$$(CH_3HSiO)_n((CH_3)_3SiO_{1/2})_2$$

wherein n is 10 to 830.

10. A black magnetic toner comprising toner composite particles which comprise:

the black magnetic composite particle set forth in claim 1 and a binder resin.

11. A black magnetic toner according to claim 10, which further have a volume resistivity of $1.0 \times 10^{13}$ to $1.0 \times 10^{16}$ Ω·cm.

12. A black magnetic toner according to claim 10, which further have a flowability index of 70 to 100.

13. A black magnetic toner according to claim 10, which further have a blackness (L* value) of 16.0 to 40.0.

14. A black magnetic toner according to claim 10, wherein said black magnetic composite particles exist inside the toner composite particles and at least a part of said black magnetic composite particles is exposed to the surface of the toner composite particle.

15. A black magnetic toner according to claim 14, wherein the content of said binder resin is 50 to 800 parts by weight based on 100 parts by weight of said black magnetic composite particles.

16. A black magnetic toner according to claim 14, wherein said toner composite particles contain magnetite particles therewithin.

17. A black magnetic toner according to claim 10, wherein the black magnetic composite particles exist in the surface of said toner composite particle.

18. A black magnetic toner according to claim 17, wherein the black magnetic composite particles are adhered on the surface of the toner composite particles and the amount of the black magnetic particles adhered is 0.1 to 9 parts by weight based on 100 parts by weight of the toner composite particles.

19. A black magnetic toner according to claim 17, wherein said toner composite particles contain magnetite particles therewithin.

20. A black magnetic toner according to claim 10, wherein a part of the black magnetic composite particles exists inside the toner composite particle in which at least a part of the black magnetic composite particles is exposed to the surface of the toner composite particle, and a part of the black magnetic composite particles exist in the surface of said toner composite particle.

21. A black magnetic toner according to claim 20, wherein the content of the binder resin is 50 to 800 parts by weight based on 100 parts by weight of said black magnetic composite particles existing inside the toner composite particle, and the amount of the black magnetic composite particles existing in the surface thereof is 0.1 to 9 parts by weight based on 100 parts by weight of the toner composite particles.

22. A black magnetic toner according to claim 20, wherein said toner composite particles further contain magnetite particles therewithin.

* * * * *